United States Patent
Maeshima et al.

(10) Patent No.: US 10,651,486 B2
(45) Date of Patent: May 12, 2020

(54) FUEL CELL SYSTEM

(71) Applicant: NISSAN MOTOR CO., LTD., Kanagawa (JP)

(72) Inventors: Susumu Maeshima, Yokohama (JP); Keigo Ikezoe, Ayase (JP); Yasushi Ichikawa, Hayama-machi (JP); Takahiro Fujii, Hayama-machi (JP); Takashi Naka, Yokosuka (JP); Daigo Iwasaki, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 769 days.

(21) Appl. No.: 14/385,269

(22) PCT Filed: Mar. 15, 2013

(86) PCT No.: PCT/JP2013/057390
§ 371 (c)(1),
(2) Date: Sep. 15, 2014

(87) PCT Pub. No.: WO2013/137431
PCT Pub. Date: Sep. 19, 2013

(65) Prior Publication Data
US 2015/0056531 A1 Feb. 26, 2015

(30) Foreign Application Priority Data
Mar. 15, 2012 (JP) ................... 2012-059276

(51) Int. Cl.
*H01M 8/04* (2016.01)
*H01M 8/04089* (2016.01)
(Continued)

(52) U.S. Cl.
CPC ... *H01M 8/04089* (2013.01); *H01M 8/04179* (2013.01); *H01M 8/04231* (2013.01);
(Continued)

(58) Field of Classification Search
CPC ......... H01M 8/04089; H01M 8/04179; H01M 8/04201; H01M 8/04231; H01M 8/04365
(Continued)

(56) References Cited

U.S. PATENT DOCUMENTS

2005/0142400 A1 6/2005 Turco et al.
2006/0263658 A1* 11/2006 Yanagi ............... H01M 8/0662
429/408
(Continued)

FOREIGN PATENT DOCUMENTS

JP 2007149630 A 6/2007
JP 2007517369 A 6/2007
(Continued)

OTHER PUBLICATIONS

English translation of JP 2010-277837, Umeki, dated Dec. 2010, Japan.*

*Primary Examiner* — Cynthia H Kelly
*Assistant Examiner* — Monique M Wills
(74) *Attorney, Agent, or Firm* — Young Basile Hanlon & MacFarlane, P.C.

(57) ABSTRACT

A fuel cell system includes a fuel cell stack configured to generate power according to a load, a fuel tank configured to store fuel gas, a pressure regulating valve configured to regulate a pressure of the fuel gas supplied from the fuel tank to the fuel cell stack, a purge valve configured to purge the fuel gas discharged from the fuel cell stack and a controller for controlling the system. The controller includes a pulsating unit configured to cause a fuel gas pressure of the fuel cell stack to pulsate, and a pressure increasing rate setting unit configured to set a pressure increasing rate of the pulsation of the fuel gas pressure according to an operating state.

9 Claims, 21 Drawing Sheets

(51) Int. Cl.
*H01M 8/04746* (2016.01)
*H01M 8/04119* (2016.01)
*H01M 8/04492* (2016.01)
*H01M 8/04537* (2016.01)
*H01M 8/04223* (2016.01)
*H01M 8/04992* (2016.01)
*H01M 8/0432* (2016.01)
*H01M 8/04082* (2016.01)

(52) U.S. Cl.
CPC ... *H01M 8/04529* (2013.01); *H01M 8/04559* (2013.01); *H01M 8/04604* (2013.01); *H01M 8/04753* (2013.01); *H01M 8/04992* (2013.01); *H01M 8/04201* (2013.01); *H01M 8/04365* (2013.01); *H01M 8/04768* (2013.01)

(58) Field of Classification Search
USPC .......................................................... 429/444
See application file for complete search history.

(56) References Cited

U.S. PATENT DOCUMENTS

| | | | | |
|---|---|---|---|---|
| 2007/0154751 A1* | 7/2007 | Katano | ............. | H01M 8/04089 429/414 |
| 2007/0184318 A1* | 8/2007 | Katano | ............. | H01M 8/04007 429/430 |
| 2007/0248858 A1* | 10/2007 | Blaszczyk et al. | ............. | 429/25 |
| 2008/0220303 A1* | 9/2008 | Yoshida | ............ | H01M 8/04097 429/423 |
| 2009/0258277 A1* | 10/2009 | Fujita | ................ | H01M 8/04089 429/415 |
| 2011/0143234 A1* | 6/2011 | Senner | ............. | H01M 8/04097 429/416 |
| 2011/0274998 A1* | 11/2011 | Ichikawa et al. | ............. | 429/446 |
| 2012/0107711 A1* | 5/2012 | Tomita | ............. | H01M 8/04388 429/446 |
| 2014/0093803 A1* | 4/2014 | Nishimura | ........ | H01M 8/04104 429/446 |

FOREIGN PATENT DOCUMENTS

| | | | |
|---|---|---|---|
| JP | 2008097966 A | | 4/2008 |
| JP | 2010129354 A | | 6/2010 |
| JP | 2010277837 A | * | 12/2010 |
| JP | 2011028937 A | | 2/2011 |
| WO | WO 2010058747 A1 | * | 5/2010 |
| WO | 2011004780 A1 | | 1/2011 |

* cited by examiner

FUEL CELL SYSTEM

CROSS REFERENCE TO RELATED APPLICATION

The present application claims priority to Japanese Patent Application No. 2012-059276, filed Mar. 15, 2012, incorporated herein in its entirety.

TECHNICAL FIELD

This invention relates to a fuel cell system.

BACKGROUND

JP2007-517369A discloses a fuel cell system in which high-pressure anode gas is repeatedly supplied and stopped, whereby a pressure of the anode gas pulsates. In such a fuel cell system, the high-pressure anode gas is supplied. This causes impurities staying in a reaction flow passage to be pushed into a buffer tank, whereby an anode gas concentration in the reaction flow passage is increased and power is generated. Subsequently, by stopping the supply of the anode gas and continuing power generation, the anode gas is consumed and a pressure in the reaction flow passage decreases. Associated with this, the anode gas discharged to the buffer tank reversely flows to be consumed for power generation reaction. When impurities reversely flowing together with the anode gas and those cross-leaking from a cathode side increase, the high-pressure anode gas is supplied again.

By repeating such operations, the anode gas concentration in the reaction flow passage is maintained to continue power generation.

Related inventions known to the public through publications are also described in JP2008-97966A and JP2007-149630A.

SUMMARY

However, the present inventors found that, since a fuel cell system was generally configured by laminating several hundreds of cells, reaction variation was likely to occur among power generation cells depending on an operating state with a control of merely causing pulsation as in JP2007-517369A. Specifically, if a pressure increasing rate of a pulsating operation is too high, for example, in a low-load operating state, anode gas flows too fast in a manifold to cause a turbulent state. In such a state, the anode gas becomes easy or difficult to flow to a reaction gas flow passage of a given power generation cell and the amount of the anode gas supplied to each cell varies. As a result, there is a possibility that impurities cannot be discharged and an anode gas concentration decreases in some cells. Then, reaction variation is likely to occur among the power generation cells. Further, power generation reaction becomes active and plenty of water is produced, for example, in a high-load operating state. In a state where gas flow passages of some power generation cells are closed by this water, gas flows in the gas flow passages of those power generation cells are obstructed. If the pressure increasing rate is too low in such a situation, gas is less likely to be supplied to the gas flow passages obstructed by the produced water, power generation reaction becomes unstable and reaction variation is likely to occur among power generation cells.

The present invention was developed in view of such conventional problems. The present invention aims to provide a fuel cell system in which reaction variation is unlikely to occur among power generation cells even if an operating state changes.

A fuel cell system according to one aspect of the present invention includes a fuel cell stack configured to generate power according to a load, a fuel tank configured to store fuel gas, a pressure regulating valve configured to regulate a pressure of the fuel gas supplied from the fuel tank to the fuel cell stack, a purge valve configured to purge the fuel gas discharged from the fuel cell stack, and a controller configured to control the system. The controller includes a pulsating unit configured to cause a fuel gas pressure of the fuel cell stack to pulsate, and a pressure increasing rate setting unit configured to set a pressure increasing rate of pulsation of the fuel gas pressure according to an operating state.

Embodiments and advantages of the present invention are described in detail below with reference to the accompanying drawings.

DESCRIPTION OF EMBODIMENTS

First Embodiment

Figure 1:
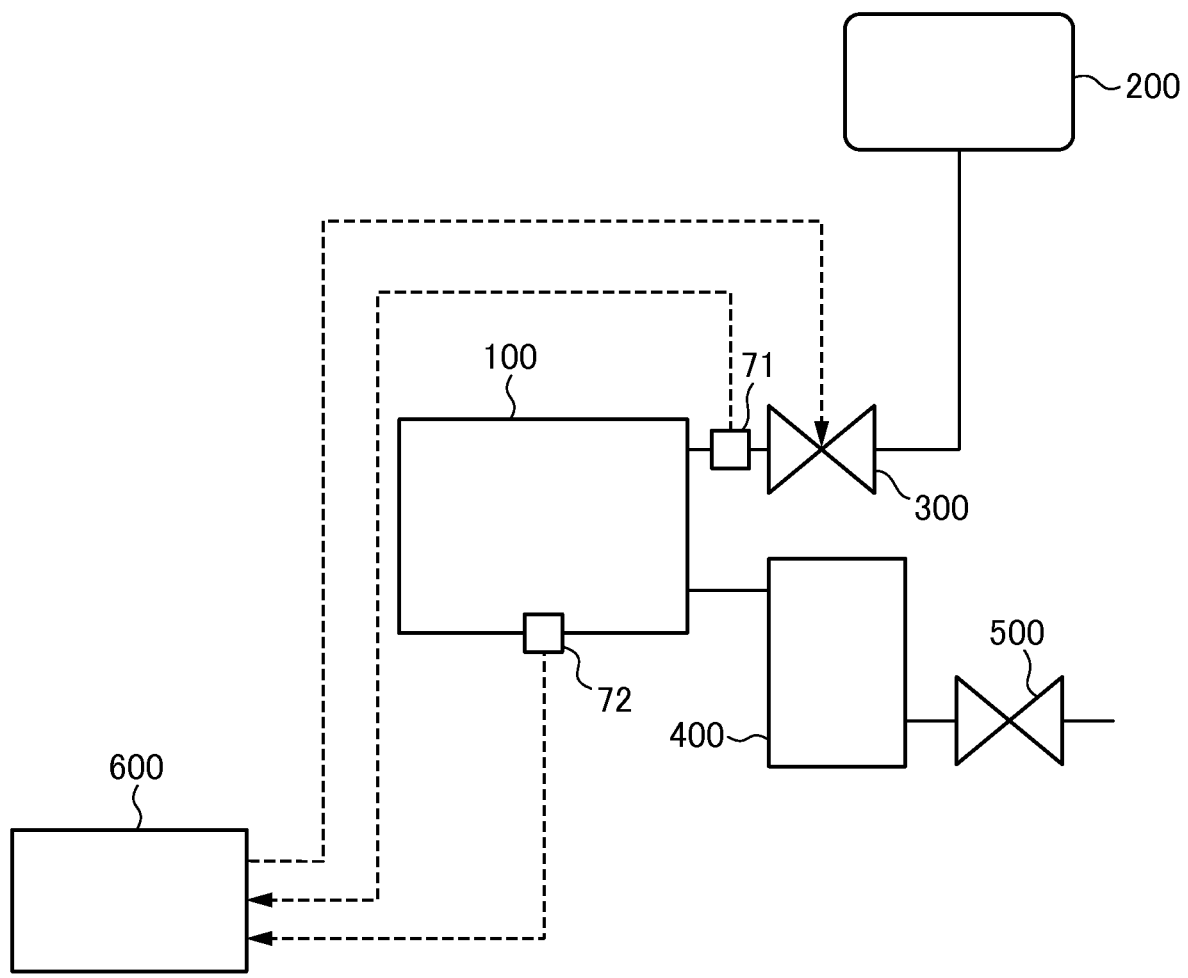
FIG. 1 is a diagram outlining a first embodiment of a fuel cell system according to the present invention.

FIG. 1 is a diagram outlining a first embodiment of a fuel cell system according to the present invention.

The fuel cell system includes a fuel cell stack 100, a hydrogen tank 200, a pressure regulating valve 300, a buffer tank 400, a purge valve 500 and a controller 600.

The fuel cell stack 100 generates power by being supplied with reaction gas (anode gas $H_2$, cathode gas $O_2$). The details are described later.

The hydrogen tank 200 is a high-pressure gas tank for storing the anode gas $H_2$ in a high-pressure state. The hydrogen tank 200 is provided on a most upstream side of an anode line.

The pressure regulating valve 300 is provided downstream of the hydrogen tank 200. The pressure regulating valve 300 regulates a pressure of the anode gas $H_2$ newly supplied to the anode line from the hydrogen tank 200. The pressure of the anode gas $H_2$ is regulated by an opening of the pressure regulating valve 300.

The buffer tank 400 is provided downstream of the fuel cell stack 100. The buffer tank 400 stores the anode gas $H_2$ discharged from the fuel cell stack 100.

The purge valve 500 is provided downstream of the buffer tank 400. When the purge valve 500 is opened, the anode gas $H_2$ is purged from the buffer tank 400.

The controller 600 controls the operation of the pressure regulating valve 300 based on signals of a pressure sensor 71 provided in the anode line, a current-voltage sensor 72 provided in the fuel cell stack 100 and the like. Specific control contents are described later.

Figure 2A:
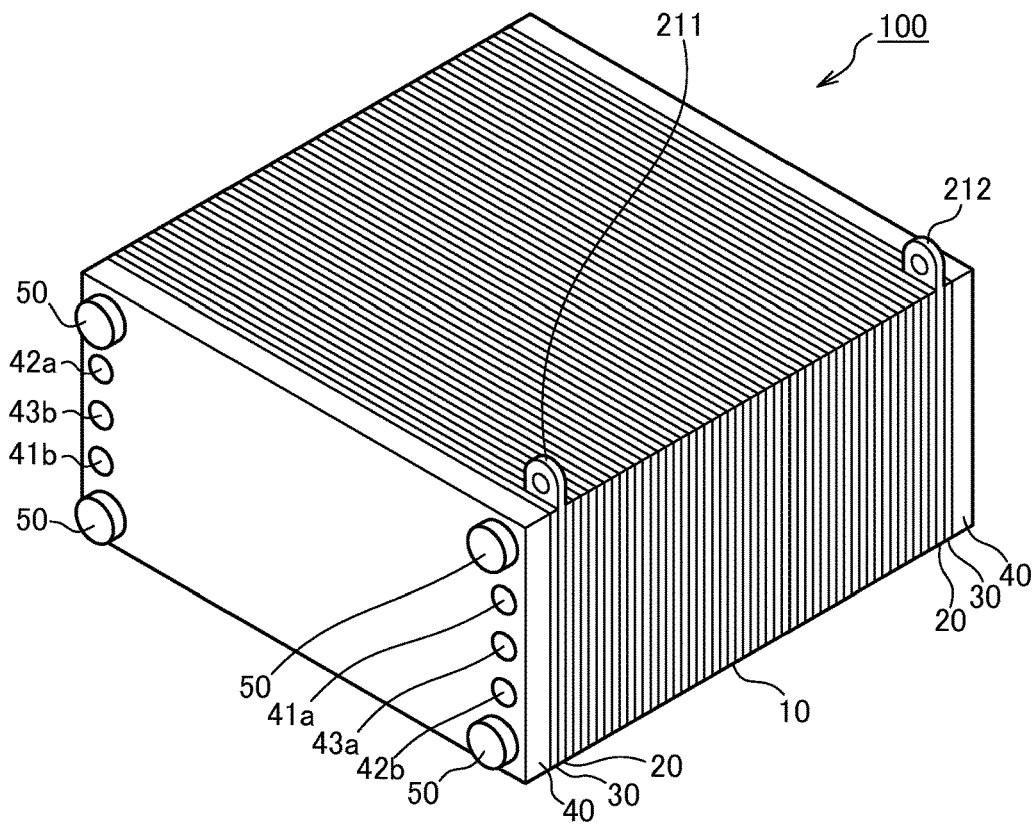
FIG. 2A is an external perspective view showing a fuel cell stack.
Figure 2B:
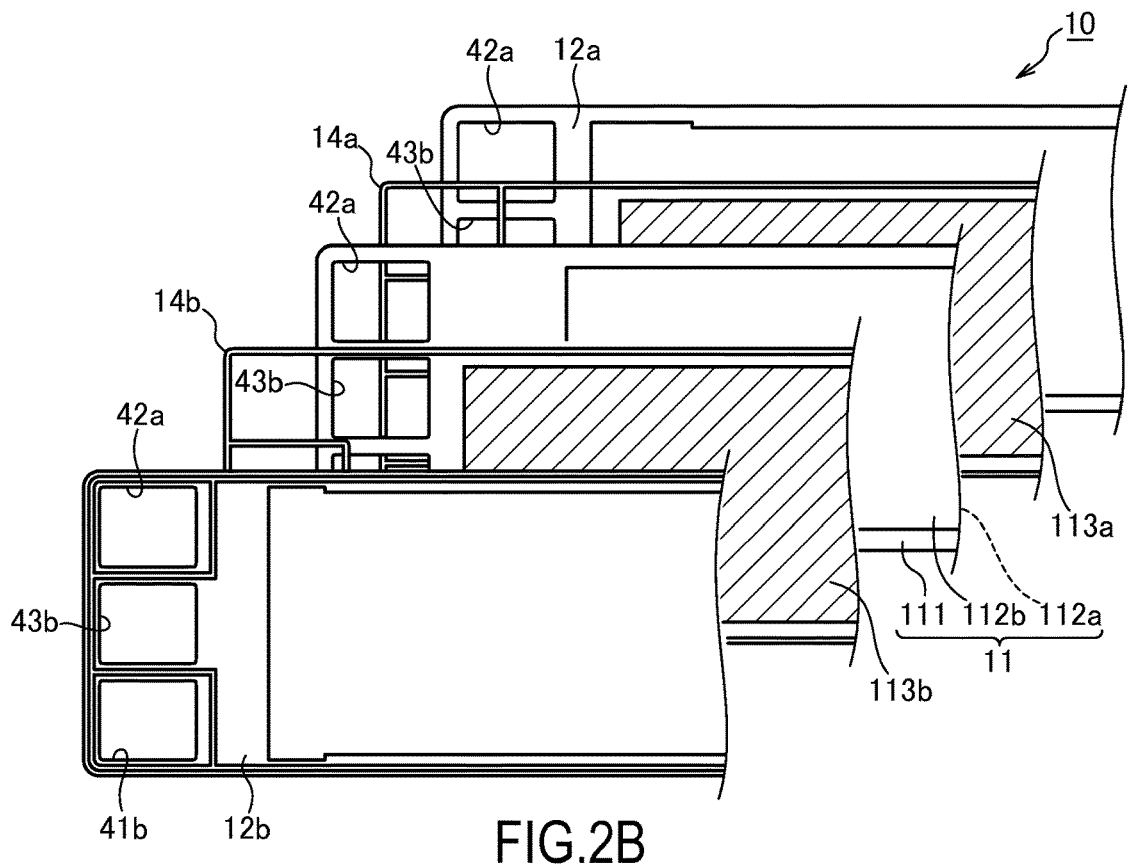
FIG. 2B is an exploded view showing the structure of a power generation cell of the fuel cell stack.

FIG. 2A is an external perspective view showing the fuel cell stack. FIG. 2B is an exploded view showing the structure of a power generation cell of the fuel cell stack.

As shown in FIG. 2A, the fuel cell stack 100 includes a plurality of laminated power generation cells 10, collector plates 20, insulating plates 30, end plates 40 and four tension rods 50.

The power generation cell 10 is a unit power generation cell of a fuel cell. Each power generation cell 10 generates an electromotive voltage of about 1 volt (V). The configuration of each power generation cell 10 is described in detail later.

The collector plates 20 are respectively arranged on outer sides of the plurality of laminated power generation cells 10. The collector plates 20 are formed of a gas-impermeable conductive material such as dense carbon. The collector plates 20 include a positive electrode terminal 211 and a negative electrode terminal 212. The fuel cell stack 100 takes out and outputs electrons e⁻ generated in each power generation cell 10 by the positive electrode terminal 211 and the negative electrode terminal 212.

The insulating plates 30 are respectively arranged on outer sides of the collector plates 20. The insulating plates 30 are formed of an insulating material such as rubber.

The end plates 40 are respectively arranged on outer sides of the insulating plates 30. The end plates 40 are formed of a rigid metal material such as steel.

One end plate 40 (end plate 40 on a left front side in FIG. 2A) is provided with an anode supply port 41a, an anode discharge port 41b, a cathode supply port 42a, a cathode discharge port 42b, a cooling water supply port 43a and a cooling water discharge port 43b. In this embodiment, the anode supply port 41a, the cooling water supply port 43a and the cathode discharge port 42b are provided on a right side of FIG. 2A. Further, the cathode supply port 42a, the cooling water discharge port 43b and the anode discharge port 41b are provided on a left side of FIG. 2A.

The tension rods 50 are respectively arranged near four corners of the end plate 40. The fuel cell stack 100 is internally formed with penetrating holes (not shown). The tension rods 50 are inserted into these through holes. The tension rods 50 are formed of a rigid metal material such as steel. To prevent an electrical short circuit between the power generation cells 10, surfaces of the tension rods 50 are insulated. Nuts (not shown since being located inside) are threadably engaged with these tension rods 50. The tension rods 50 and the nuts tighten the fuel cell stack 100 in a lamination direction.

A method for supplying hydrogen as the anode gas to the anode supply port 41a may be, for example, a method for directly supplying hydrogen gas from a hydrogen storage device or a method for modifying fuel containing hydrogen and supplying modified hydrogen-containing gas. It should be noted that the hydrogen storage device may be a high-pressure gas tank, a liquefied hydrogen tank, a hydrogen occlusion alloy tank or the like. The fuel containing hydrogen may be natural gas, methanol, gasoline or the like. In FIG. 1, a high-pressure tank is used. Further, air is generally used as cathode gas to be supplied to the cathode supply port 42a.

As shown in FIG. 2B, the power generation cell 10 is structured such that an anode separator (anode bipolar plate) 12a and a cathode separator (cathode bipolar plate) 12b are arranged on both sides of a membrane electrode assembly (MEA) 11.

In the MEA 11, electrode catalyst layers 112 are formed on both surfaces of an electrolyte membrane 111 composed of an ion exchange membrane. Gas diffusion layers (GDLs) 113 are formed on these electrode catalyst layers 112.

The electrode catalyst layer 112 is, for example, formed of carbon black particles carrying platinum or the like.

The GDL 113 is formed of a member having a sufficient gas diffusion property and electrical conductivity, e.g. formed of carbon fibers.

The anode gas supplied from the anode supply port 41a flows through these GDLs 113a to react with the anode electrode catalyst layers 112 (112a) and is discharged from the cathode discharge port 41b.

The cathode gas supplied from the cathode supply port 42a flows through these GDLs 113b to react with the cathode electrode catalyst layers 112 (112b), and is discharged from the cathode discharge port 42b.

The anode separator 12a is placed on one surface (back surface in FIG. 2B) of the MEA 11 via the GDL 113a and a seal 14a. The cathode separator 12b is placed on one surface (front surface in FIG. 2B) of the MEA 11 via the GDL 113b and a seal 14b. The seals 14 (14a, 14b) are rubber-like elastic members made of, for example, silicon rubber, ethylene propylene diene monomer (EPDM) or fluororubber. The anode and cathode separators 12a, 12b are each formed, for example, by press-molding a separator base body made of metal such as stainless steel, forming reaction gas flow passages on one surface and forming cooling water flow passages on an opposite surface such that the reaction gas flow passages and the cooling water flow passages are alternately arranged. As shown in FIG. 2B, the anode and cathode separators 12a, 12b are joined to form the cooling water flow passages.

The MEA 11, the anode separator 12a and the cathode separator 12b are respectively formed with holes 41a, 41b, 42a, 42b, 43a and 43b. These are joined to form the anode supply port (anode supply manifold) 41a, the anode discharge port (anode discharge manifold) 41b, the cathode supply port (cathode supply manifold) 42a, the cathode discharge port (cathode discharge manifold) 42b, the cooling water supply port (cooling water supply manifold) 43a and the cooling water discharge port (cooling water discharge manifold) 43b.

Figure 3A:
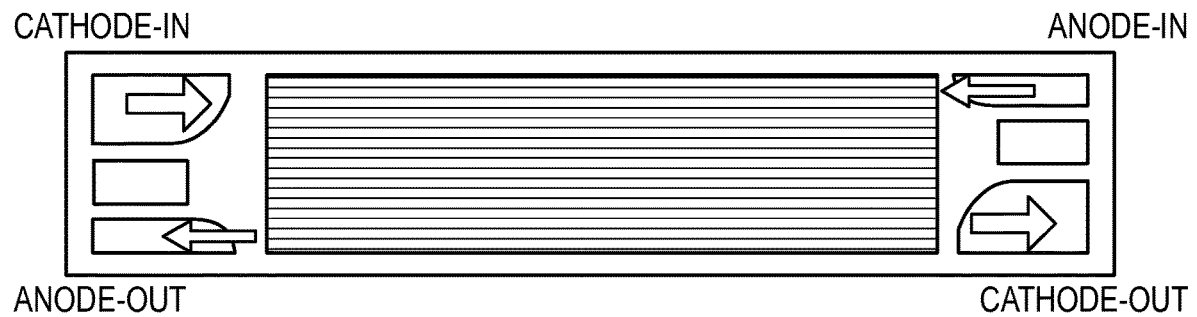
FIG. 3A is a diagram showing the reaction of an electrolyte membrane in the fuel cell stack.
Figure 3B:
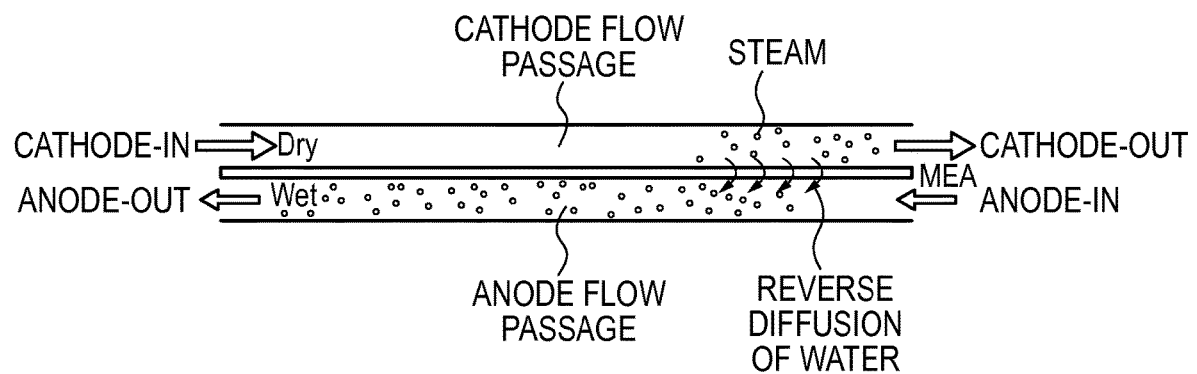
FIG. 3B is a diagram showing the reaction of the electrolyte membrane in the fuel cell stack.

FIGS. 3A and 3B are diagrams showing the reaction of the electrolyte membrane in the fuel cell stack.

As described above, the fuel cell stack 100 generates power by being supplied with the reaction gas (cathode gas $O_2$, anode gas $H_2$). The fuel cell stack 100 is configured by laminating several hundreds of membrane electrode assemblies (MEAs) in each of which the cathode electrode catalyst layer and the anode electrode catalyst layer are formed on the both surfaces of the electrolyte membrane. One MEA out of those is shown in FIG. 3A. Here is shown an example in which the anode gas is supplied (anode-in) and discharged from a diagonal side (anode-out) while the cathode gas is supplied to the MEA (cathode-in) and discharged from a diagonal side (cathode-out).

In each membrane electrode assemblies (MEA), the following reactions proceed according to a load in the cathode and anode electrode catalyst layers to generate power.

Chemical Formulae 1

Cathode electrode catalyst layer: 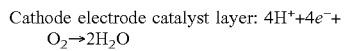
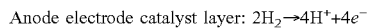 (1-1)

Anode electrode catalyst layer: $2H_2 \rightarrow 4H^+ + 4e^-$ (1-2)

As shown in FIG. 3B, the reaction of the above formula (1-1) proceeds to produce steam as the reaction gas (cathode gas $O_2$) flows in the cathode flow passage. Then, relative humidity increases on a downstream side of the cathode flow passage. As a result, a relative humidity difference between a cathode side and an anode side increases. Using this relative humidity difference as a driving force, water is reversely diffused to humidify an anode upstream side. This moisture further evaporates from the MEA to the anode flow passage to humidify the reaction gas (anode gas $H_2$) flowing in the anode flow passage, and then carried to an anode downstream side to humidify the MEA on the anode downstream side.

To efficiently generate power by the above reactions, the electrolyte membrane needs to be in a suitable wet state. The above reactions are not promoted if the electrolyte membrane has a low moisture content and a degree of wetness thereof is too low. On the contrary, if the electrolyte membrane has too high a moisture content, the reaction gas flow passage is overflowed with excess moisture and the flow of the gas is obstructed. Also in such a case, the above reactions are not promoted. Thus, if the electrolyte membrane is in a suitable wet state, power is efficiently generated. A targeted degree of wetness (target degree of wetness) is a fixed value regardless of a load. An optimal degree of wetness is empirically given, considering power generation efficiency corresponding to the degree of wetness and a degree of freezing at the start associated with the water content of the electrolyte membrane. During an operation, a degree of wetness feedback control is executed by regulating a cooling water temperature, a cathode gas pressure and a cathode flow rate so that the degree of wetness detected based on HFR (High Frequency Resistance) becomes the target degree of wetness given as described above. Assuming that most condensed water is present in the anode flow passage when the degree of wetness is higher than the target degree of wetness, a pressure increasing rate when the anode gas is supplied in a pulsating manner is increased. It should be noted that the HFR (High Frequency Resistance) is obtained, for example, by a known alternating current impedance method. Specifically, a voltage value of the fuel cell stack 100 when a high-frequency alternating current is superimposed on an output current of the fuel cell stack 100 is detected by a voltage sensor, a voltage amplitude of the superimposed alternating current is computed based on that voltage value, and an impedance (HFR) is calculated by dividing that voltage amplitude by a current amplitude of the superimposed alternating current. The higher the impedance (HFR) is, the drier the electrolyte membrane becomes. It should be noted that the impedance (HFR) calculation method is not limited to the above method. For example, a method described in JP2012-054153A filed by the present applicant may be used.

Specifically, the present inventors executed the following control.

Figure 4:
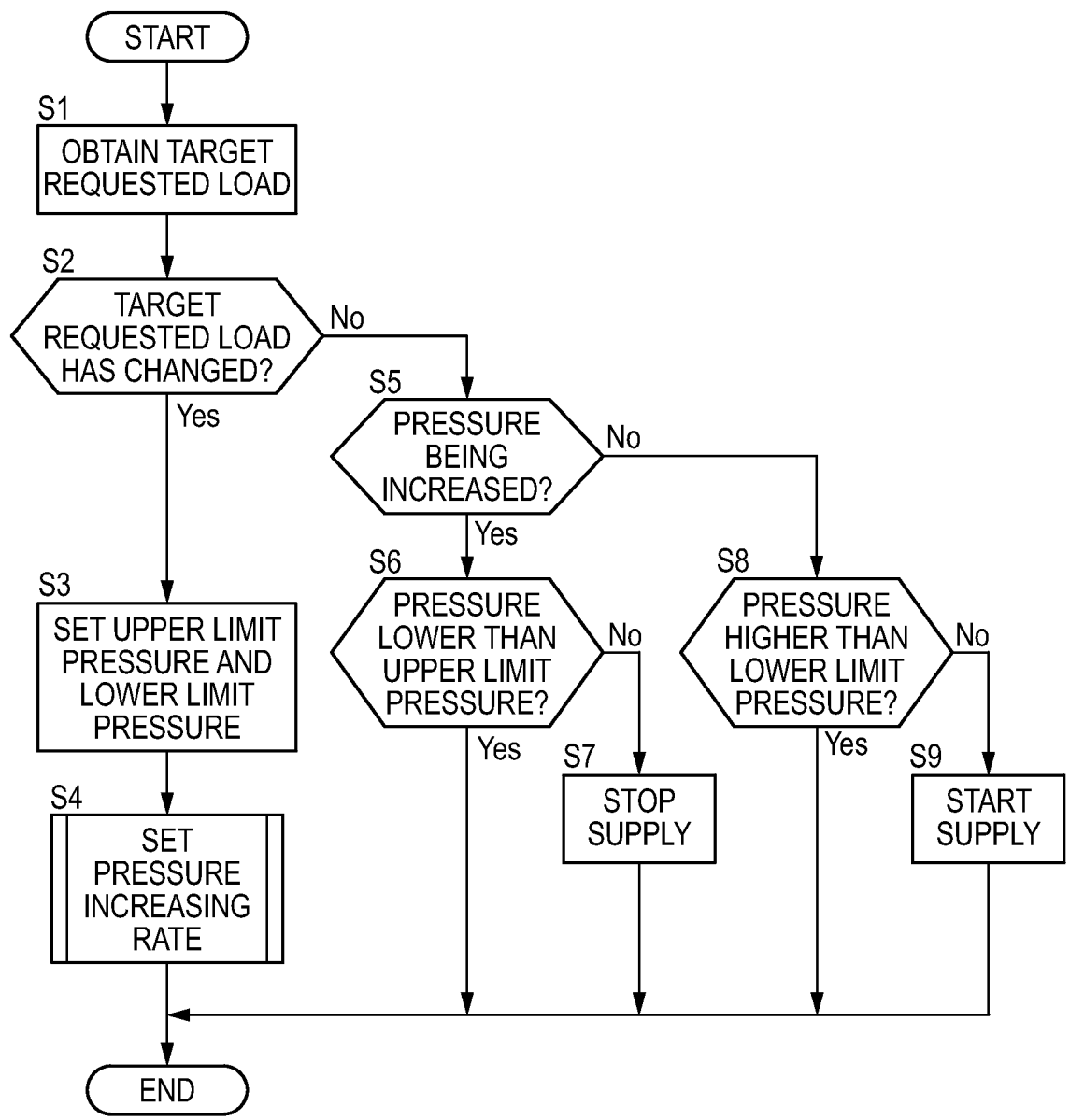
FIG. 4 is a control flow chart to be executed by a controller of the first embodiment of the fuel cell system.

FIG. 4 is a control flow chart to be executed by the controller of the first embodiment of the fuel cell system. It should be noted that the controller repeatedly executes this flow chart at every infinitesimal time interval (e.g. 10 msec).

In Step S1, the controller obtains a target requested load. Specifically, the target requested load may be computed such as based on an accelerator pedal depressed amount by a driver.

In Step S2, the controller determines whether or not the target requested load has changed. The controller proceeds to Step S3 if a determination result is affirmative while proceeding to Step S5 if the determination result is negative.

Figure 5:
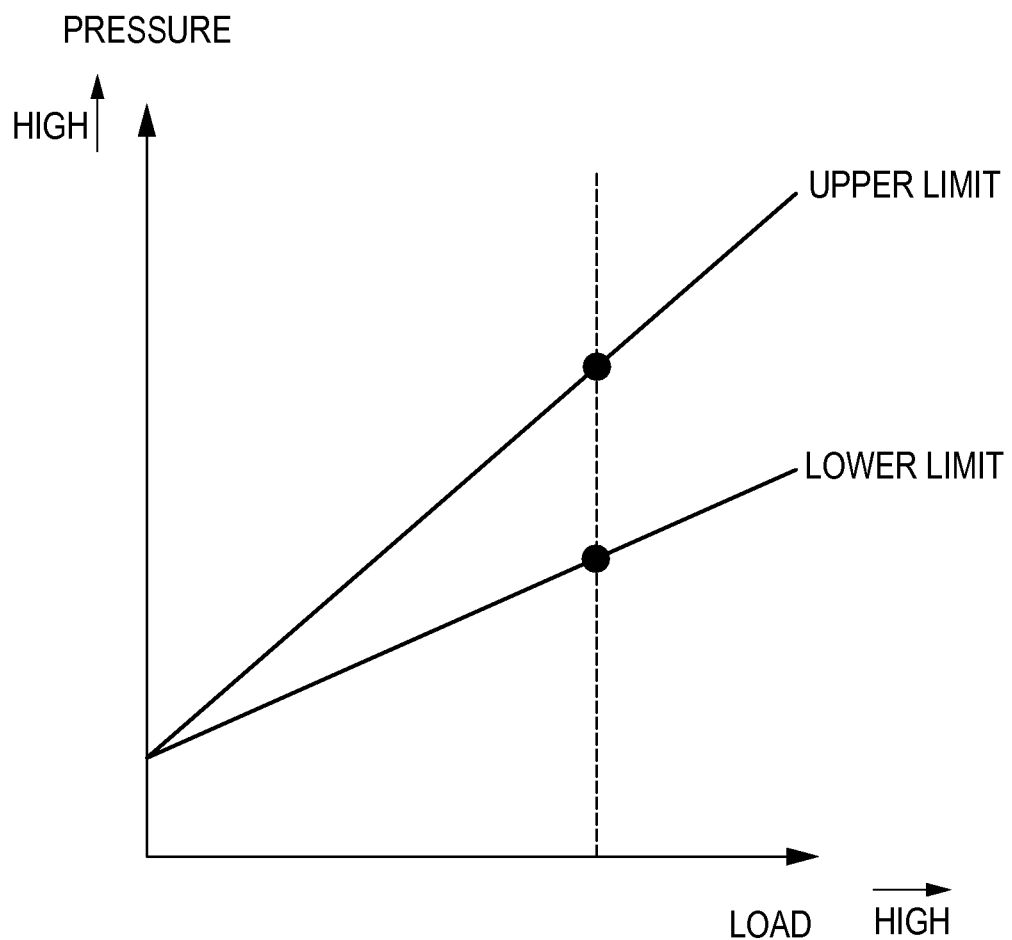
FIG. 5 is a graph showing an example of a map for setting a target upper limit pressure and a target lower limit pressure of a pulsating operation of reaction gas.

In Step S3, the controller sets a target upper limit pressure and a target lower limit pressure of a pulsating operation of the reaction gas. Specifically, a map, for example, as shown in FIG. 5 is prepared in advance through experiments. By applying the target requested load to that map, the target upper limit pressure and the target lower limit pressure of the pulsating operation of the reaction gas are set.

Figure 6:
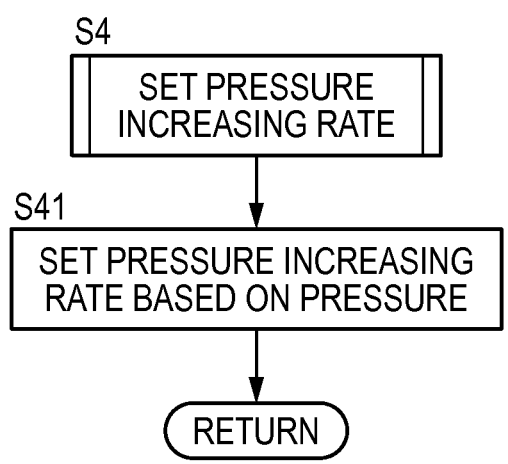
FIG. 6 is a flow chart showing a pressure increasing rate setting routine of the first embodiment of the fuel cell system.
Figure 7A:
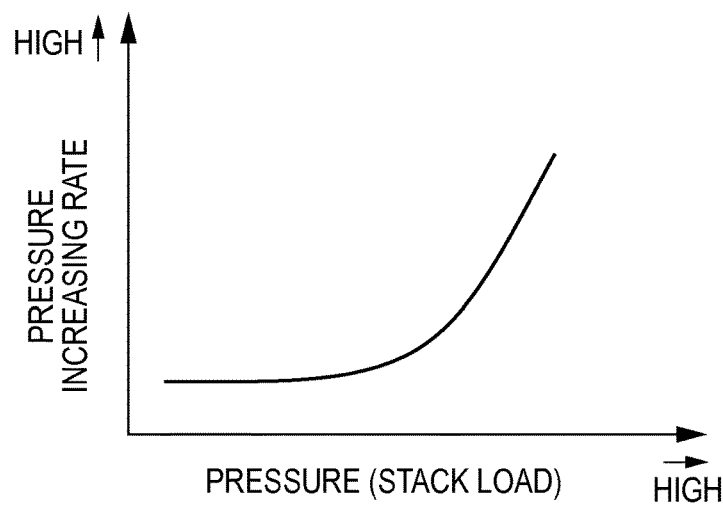
FIG. 7A is a graph illustrating a map for setting a pressure increasing rate of the first embodiment of the fuel cell system.
Figure 7B:
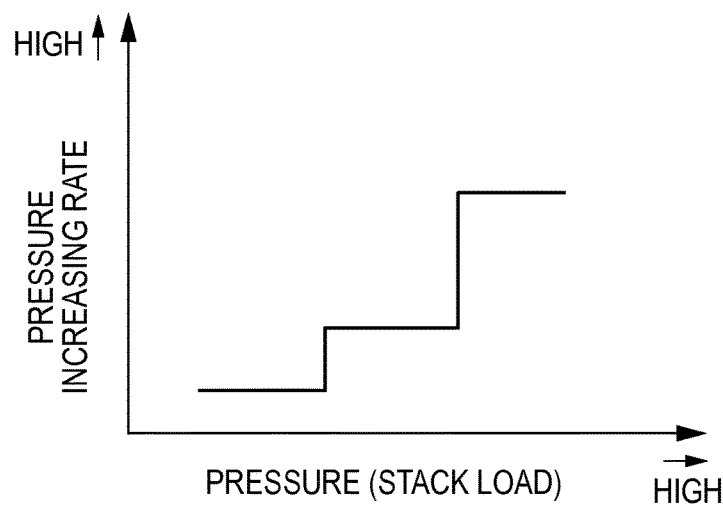
FIG. 7B is a graph illustrating a map for setting the pressure increasing rate of the first embodiment of the fuel cell system.
Figure 7C:
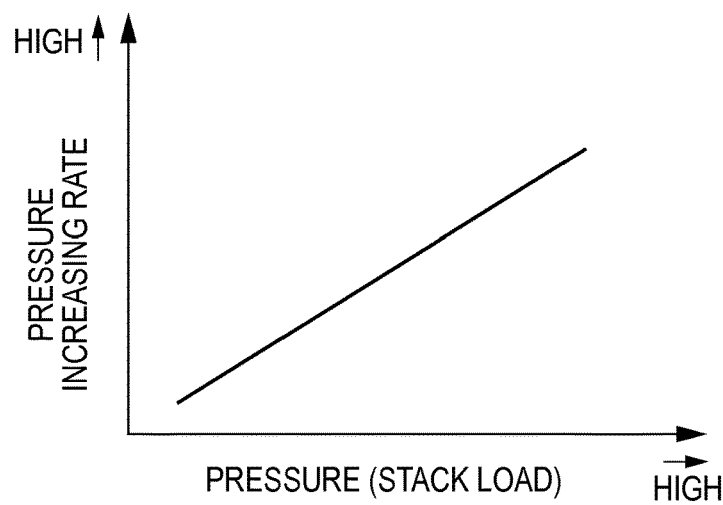
FIG. 7C is a graph illustrating a map for setting the pressure increasing rate of the first embodiment of the fuel cell system.

In Step S4, the controller sets the pressure increasing rate when the pressure of the reaction gas is increased. Specifically, as shown in FIG. 6, the pressure increasing rate is set based on a pressure (Step S41). It should be noted that the pressure mentioned here is, for example, an average pressure of the target upper limit pressure and the target lower limit pressure. A map as shown in FIG. 7A is prepared in advance through experiments, and the pressure increasing rate is set by applying the pressure to that map. It should be noted that the map may be a simple one as shown in FIGS. 7B and 7C. In any case, the pressure increasing rate tends to increase as the pressure increases.

In Step S5, the controller determines whether or not the pressure is currently being increased. The controller proceeds to Step S6 if a determination result is affirmative while proceeding to Step S8 if the determination result is negative.

In Step S6, the controller determines whether or not the current pressure is lower than the target upper limit pressure. The controller exits from this process if a determination result is affirmative while proceeding to Step S7 if the determination result is negative.

In Step S7, the controller stops the supply of the reaction gas.

In Step S8, the controller determines whether or not the current pressure is higher than the target lower limit pressure. The controller exits from this process if a determination result is affirmative while proceeding to Step S9 if the determination result is negative.

In Step S9, the controller starts the supply of the reaction gas.

Figure 8:
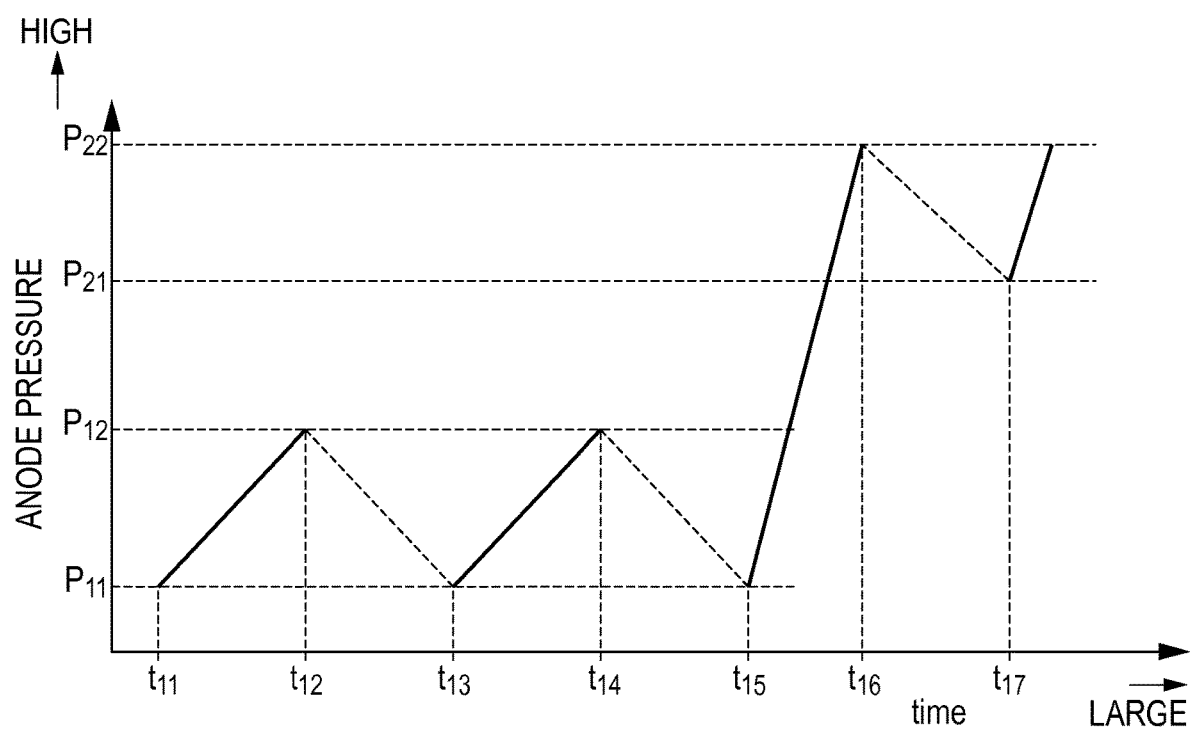
FIG. 8 is a timing chart showing an operation when the control flow chart of the first embodiment is executed.

FIG. 8 is a timing chart showing an operation when the control flow chart of the first embodiment is executed.

It should be noted that Step numbers starting with S of the flow chart are also written to facilitate correspondence to the aforementioned flow chart.

The following operation is made while the above control flow chart is executed.

In FIG. 8, before time t11, processings of Steps S1→S2→S3→S4 are performed before time t11 and the target lower limit pressure P11 and the target upper limit pressure P12 of the pulsating operation are set based on the target requested load. Further, the pressure increasing rate when the pressure of the reaction gas is increased is set.

After time t11, processings of Steps S1→S2→S5→S6 are repeatedly performed. As a result, an anode pressure increases as shown in FIG. 8.

When the anode pressure reaches the target upper limit pressure P12 at time t12, processings of Steps S6→S7 are performed. As a result, the anode pressure starts decreasing as shown in FIG. 8.

After time t12, processings of Steps S1→S2→S5→S8 are repeated. Since the anode gas is consumed in the power generation reaction also while the supply of the anode gas is stopped, the anode pressure continues to decrease as shown in FIG. 8.

When the anode pressure reaches the target lower limit pressure P11 at time t13, processings of Steps S8→S9 are performed. As a result, the anode pressure starts increasing as shown in FIG. 8.

A similar control is repeated until time t15.

If the target requested load increases such as due to the depression of an accelerator pedal at time t15, processings of Steps S1→S2→S3→S4 are performed and a target lower limit pressure P21 and a target upper limit pressure P22 are set again based on the target requested load. Further, the pressure increasing rate is set again. It should be noted that a gradient when the anode pressure increases after time t15 is steeper than that when the anode pressure increases before time t15 as is clear from FIG. 8. Specifically, the pressure increasing rate of the anode pressure after time t15 is faster than that of the anode pressure before time t15.

After time t15, processings of Steps S1→S2→S5→S6 are repeated. As a result, the anode pressure increases.

When the anode pressure reaches the target upper limit pressure P22 at time t16, processings of Steps S6→S7 are performed. As a result, the anode pressure starts decreasing.

After time t16, processings of Steps S1→S2→S5→S8 are repeated. Since the anode gas is consumed in the power generation reaction also while the supply of the anode gas is stopped, the anode pressure continues to decrease.

When the anode pressure reaches the target lower limit pressure P21 at time t17, processings of Steps S8→S9 are performed. As a result, the anode pressure starts increasing as shown in FIG. 8.

A similar control is repeated thereafter.

Figure 9A:
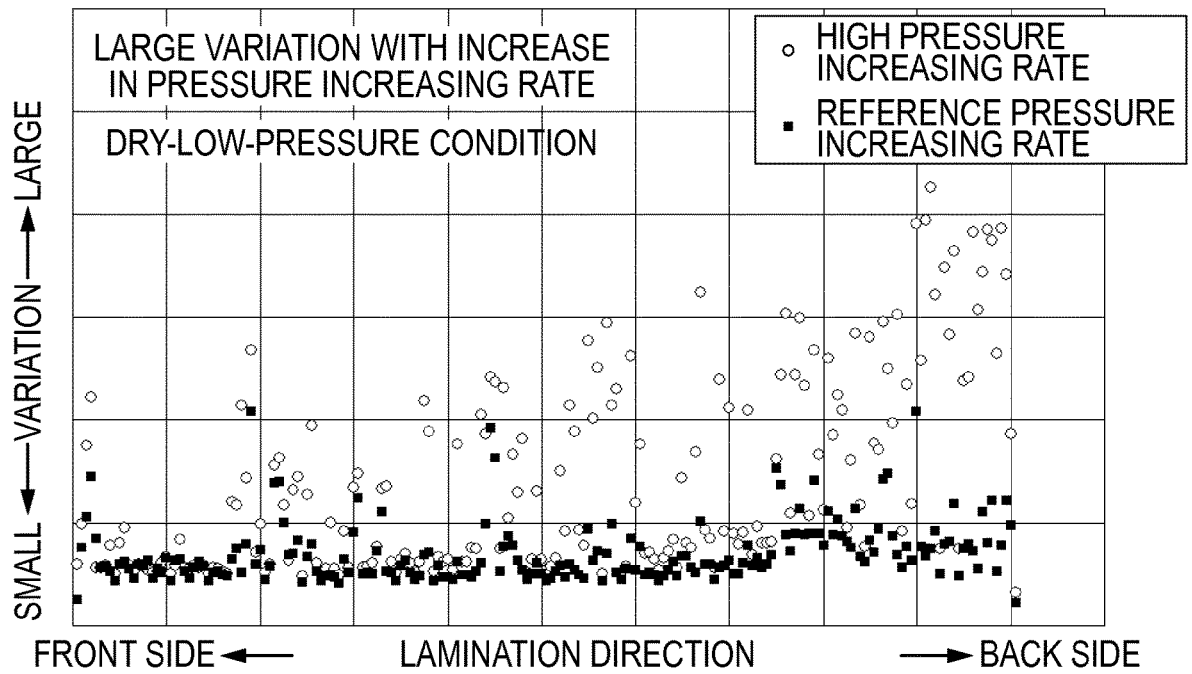
FIG. 9A is a graph showing functions and effects of the first embodiment.
Figure 9B:
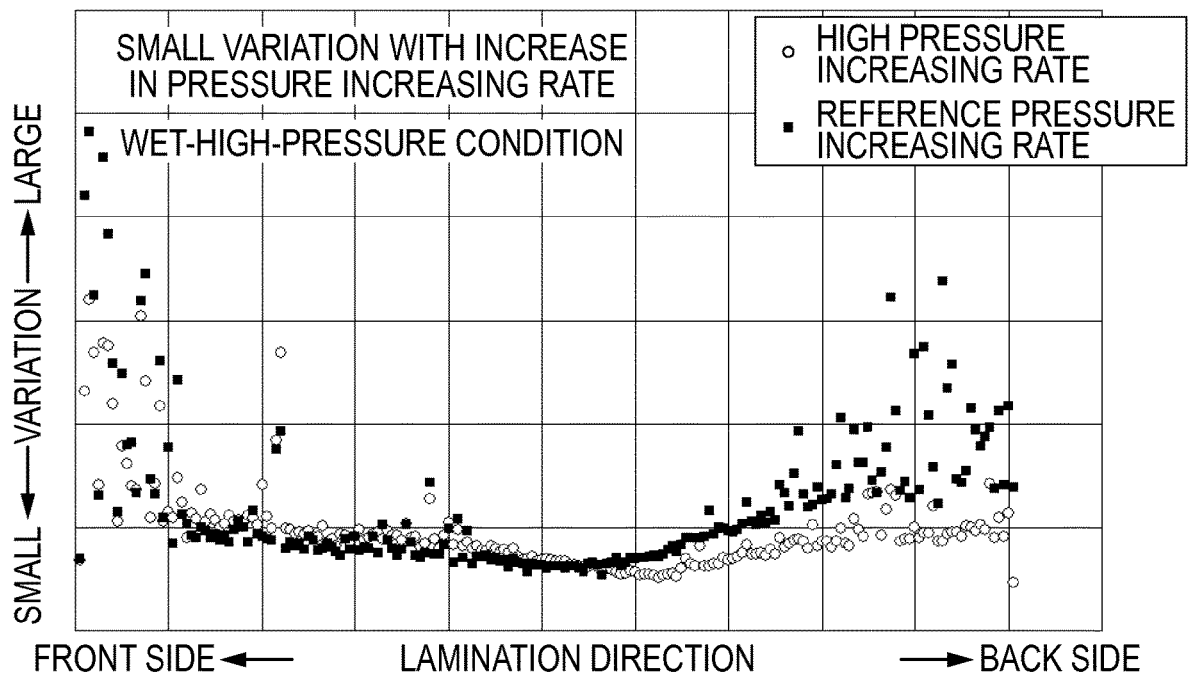
FIG. 9B is a graph showing functions and effects of the first embodiment.

FIGS. 9A and 9B are graphs showing functions and effects of the first embodiment. It should be noted that horizontal axes of the graphs represent the positions of a plurality of laminated power generation cells 10. A left side is a front side shown in FIG. 2 and a right side is a back side shown in FIG. 2. Vertical axes of the graphs represent a power generation amount of each power generation cell during an infinitesimal time. If differences in this power generation amount are small, it is found that variation is small and power generation is stable. If differences in this power generation amount are large, it is found that variation is large and power generation is not stable.

As described above, in the present embodiment, higher target upper limit pressure and target lower limit pressure of the pulsating operation are set and a higher pressure increasing rate is set with an increase in the load requested by the fuel cell stack.

If the load requested to the fuel cell stack is low, the power generation reaction expressed by Formula (1-1) occurs accordingly. In such a case, the power generation variation among the power generation cells is smaller as shown by black rectangles of FIG. 9A if the pressure is increased at a reference rate without increasing the pressure increasing rate too much. Specifically, stable power generation reaction occurs.

Contrary to this, if the pressure increasing rate is increased, the power generation variation among the power generation cells is large as indicated by white circles of FIG. 9A. Specifically, the power generation reaction becomes unstable.

The present inventors considers this as follows. Specifically, if the pressure increasing rate is increased, a flow velocity of the anode gas flowing in the anode supply manifold suddenly increases. Then, the flow rate of the gas flowing from the anode supply manifold to the gas flow passage of each power generation cell varies. This is because the anode gas flowing in the anode supply manifold becomes turbulent to obstruct a uniform flow to the gas flow passage of each power generation cell and make distribution variation large if the flow velocity of the anode gas flowing in the anode supply manifold suddenly increases. Unless the flow velocity of the anode gas flowing in the anode supply manifold is fast, the anode gas is thought to substantially uniformly flow from the anode supply manifold to the gas flow passage of each power generation cell to make the distribution variation small. The above is the consideration of the present inventors.

On the other hand, if the load requested to the fuel cell stack is high, the power generation reaction expressed by Formula (1-1) becomes active. In such a case, the power generation variation among the power generation cells is smaller as shown by white circles of FIG. 9B if the pressure increasing rate is increased. Specifically, stable power generation reaction occurs.

Contrary to this, if the pressure is increased at the reference rate, the power generation variation among the power generation cells is large as shown by black rectangles of FIG. 9B. Specifically, the power generation reaction becomes unstable.

The present inventors considers this as follows. Specifically, if the load requested to the fuel cell stack is high, the power generation reaction expressed by Formula (1-1) becomes active and plenty of water is produced. In a state where this water stays in the gas flow passage of each power generation cell, the flow of the gas is obstructed and the power generation reaction becomes unstable. Contrary to this, if the flow velocity of the anode gas flowing in the anode supply manifold is quickly increased by increasing the pressure increasing rate, the produced water staying in the gas flow passage of each power generation cell is removed and the power generation reaction becomes stable. However, if the pressure is increased at the reference rate, the produced water staying in the gas flow passage of each power generation cell is insufficiently removed and power generation reaction becomes unstable according to the knowledge of the present inventors.

Further, when the load requested to the fuel cell stack is high, the pressure of the gas supplied to the fuel cell stack also increases.

The flow velocity differs between a state where the pressure of the gas is high and a state where the pressure of the gas is low even if the gas pressure increasing rate is increased by the same amount in. Specifically, the flow velocity of the gas is slower, i.e. the gas is supplied less in the state where the pressure of the gas is high than in the state where the pressure of the gas is low even if the gas pressure increasing rate is increased by the same amount.

Contrary to this, in this embodiment, a higher pressure increasing rate is set in conformity with the setting of higher target pressures of the pulsating operation as the load requested to the fuel cell stack increases. Thus, a proper amount of the gas is likely to be supplied.

As described above, according to this embodiment, the power generation variation among the power generation cells is unlikely to occur and power generation easily becomes stable even if the load requested to the fuel cell stack (operating state) changes. Further, if there is a distribution variation and the reaction gas is insufficient in each power generation cell, there is a possibility of deteriorating the cells. However, since the distribution variation can be suppressed in this embodiment, the deterioration of the cells can be prevented.

Second Embodiment

Figure 10:
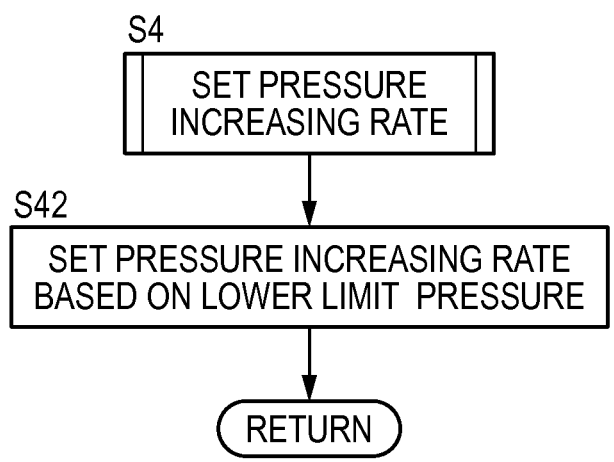
FIG. 10 is a flow chart showing a pressure increasing rate setting routine of a second embodiment of the fuel cell system.

FIG. 10 is a flow chart showing a pressure increasing rate setting routine of a second embodiment of the fuel cell system.

It should be noted that components having the same functions as the aforementioned components are denoted by the same reference signs and repeated description is omitted as appropriate.

Figure 11A:
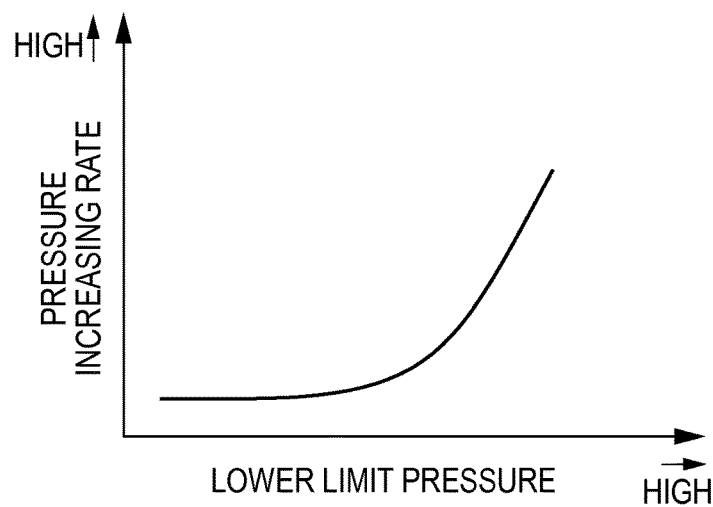
FIG. 11A is a graph illustrating a map for setting a pressure increasing rate of the second embodiment of the fuel cell system.
Figure 11B:
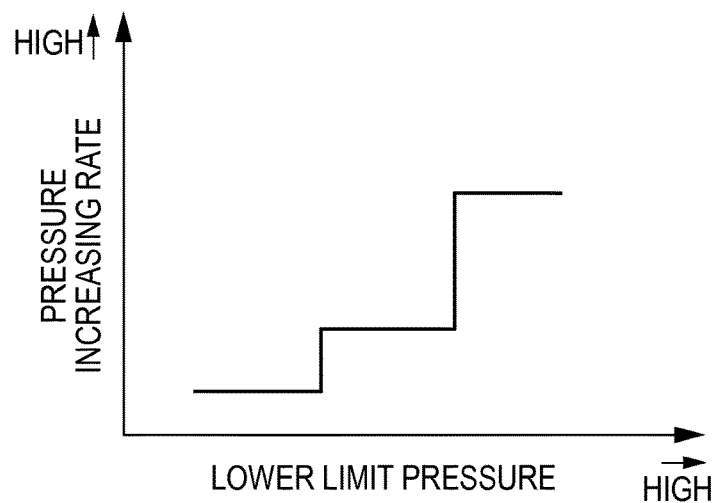
FIG. 11B is a graph illustrating a map for setting the pressure increasing rate of the second embodiment of the fuel cell system.
Figure 11C:
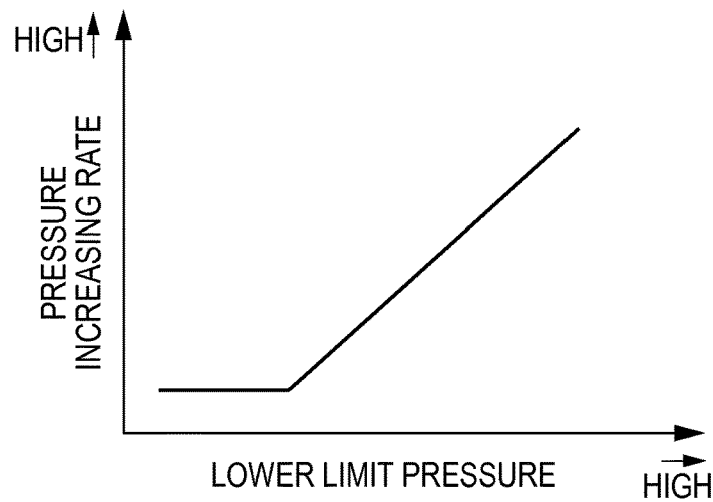
FIG. 11C is a graph illustrating a map for setting the pressure increasing rate of the second embodiment of the fuel cell system.

In the first embodiment, the pressure increasing rate is set based on the pressure (e.g. average pressure of the target upper limit pressure and the target lower limit pressure) (Step S41). Contrary to this, in this second embodiment, the pressure increasing rate is set based on the target lower limit pressure without considering the target upper limit pressure (Step S42). Specifically, a map as shown in FIG. 11A is prepared in advance through experiments and the pressure increasing rate is set by applying the target upper limit pressure to that map. It should be noted that the map may be a simple one as shown in FIGS. 11B and 11C. In any case, the pressure increasing rate tends to increase as the target lower limit pressure increases.

Figure 12:
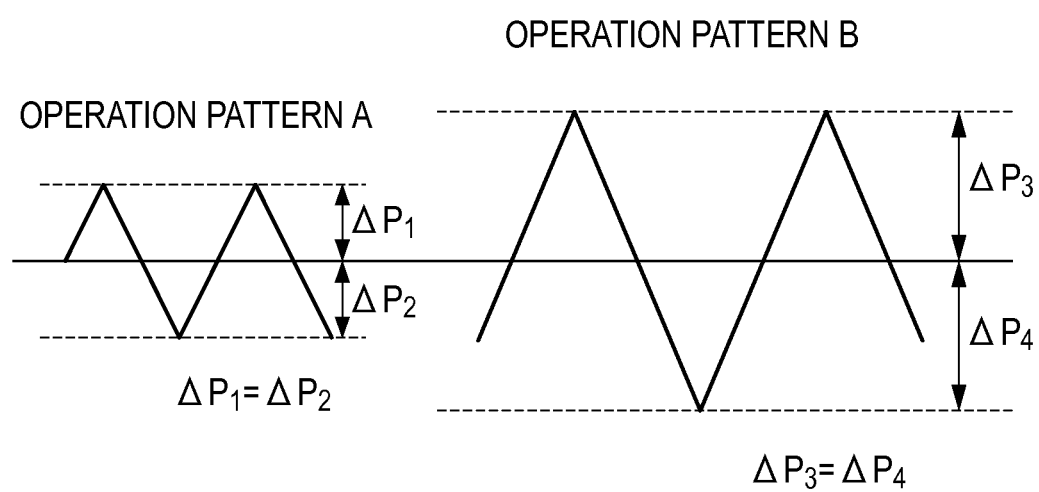
FIG. 12 is a chart showing functions and effects of the second embodiment.

FIG. 12 is a chart showing functions and effects of the second embodiment.

A pulsating operation pattern A and a pulsating operation pattern B are considered.

An average pressure of a target upper limit pressure and a target lower limit pressure of the pulsating operation pattern B is the same as that of the pulsating operation pattern A. However, the pulsating operation pattern B pulsates with a larger amplitude than the pulsating operation pattern A. In such a case, since the lower limit pressure is lower in the pulsating operation pattern B, the flow velocity of the gas is likely to be faster even if the pressure increasing rate is the same. Thus, distribution variation to the gas flow passage of each power generation cell is likely to become large.

Contrary to this, since the pressure increasing rate is set based on the target lower limit pressure in the second embodiment, a lower pressure increasing rate is set for the pulsating operation pattern B than for the pulsating operation pattern A. Thus, in the pulsating operation pattern B, the flow velocity of the anode gas flowing in the anode supply manifold is slower and the anode gas is more likely to uniformly flow from the anode supply manifold to the gas flow passage of each power generation cell than in the pulsating operation pattern A. Specifically, the distribution variation becomes smaller. Therefore, stable power generation reaction is possible.

Third Embodiment

Figure 13:
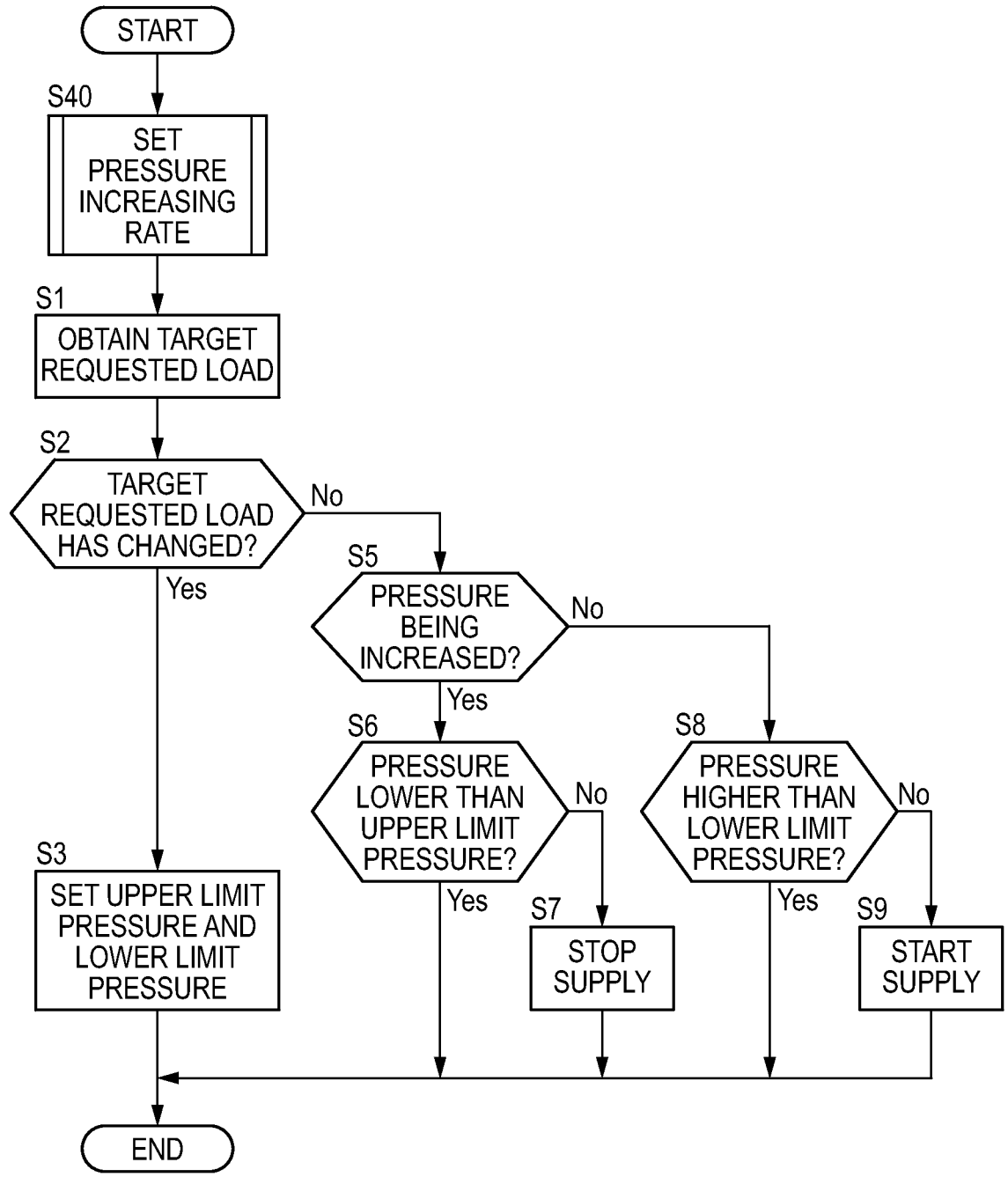
FIG. 13 is a control flow chart to be executed by a controller of a third embodiment of the fuel cell system.

FIG. 13 is a control flow chart to be executed by a controller of a third embodiment of the fuel cell system.

In this third embodiment, as shown in FIG. 13, the pressure increasing rate is set in Step S40 before branching of Step S2. Since other Steps S1 to S3, S5 to S9 are the same as in FIG. 4, they are not described in detail. It should be noted that Step S40 is described in detail with reference to FIG. 14.

Figure 14:
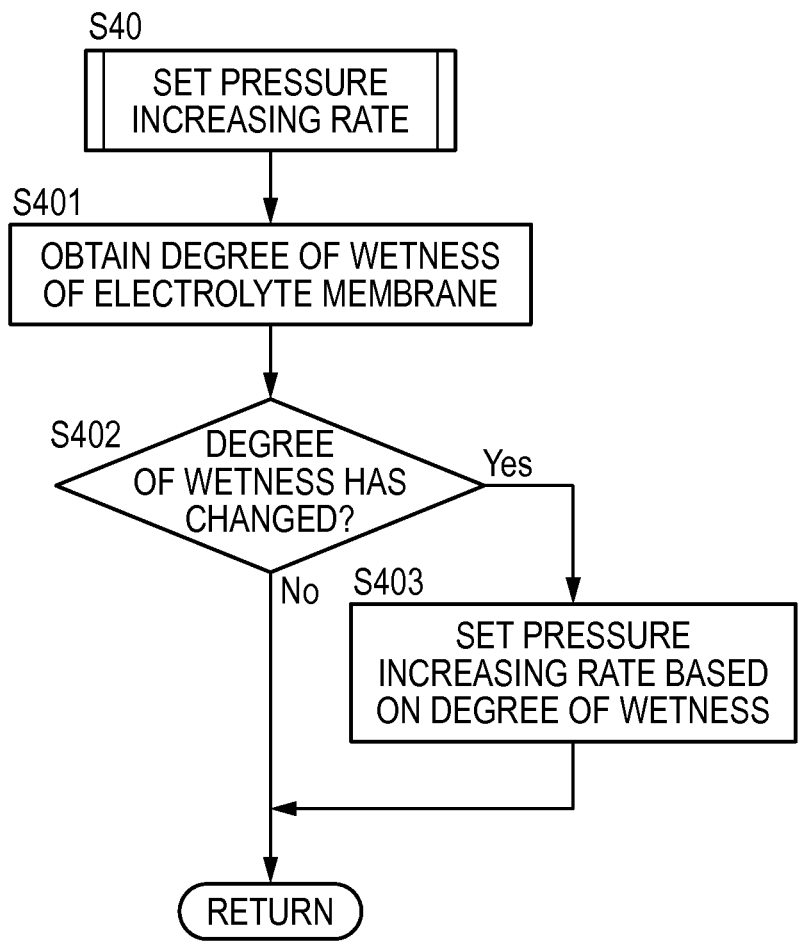
FIG. 14 is a flow chart showing a pressure increasing rate setting routine of the third embodiment of the fuel cell system.

FIG. 14 is a flow chart showing a pressure increasing rate setting routine of the third embodiment of the fuel cell system.

In Step S401, the controller obtains a degree of wetness of the electrolyte membrane. The degree of wetness of the electrolyte membrane changes according to an impedance. Specifically, the lower the degree of wetness of the electrolyte membrane (the drier the electrolyte membrane by having a low water content) is, the higher the impedance becomes. The higher the degree of wetness of the electrolyte membrane (the wetter the electrolyte membrane by having a high water content) is, the lower the impedance becomes. In Step S401, utilizing this property, voltage fluctuation is seen by fluctuating a power generation current of the fuel cell stack, for example, in a sine wave of 1 kHz. Then, the impedance is calculated by dividing an alternating current voltage amplitude of 1 kHz by an alternating current amplitude. Then, the degree of wetness of the electrolyte membrane can be obtained based on this impedance.

In Step S402, the controller determines whether or not the degree of wetness of the electrolyte membrane has changed. It should be noted that, specifically, the determination is affirmative if the degree of wetness changes beyond a certain range. This is to prevent an error. The controller exits from this process if a determination result is negative while proceeding to Step S403 if the determination result is affirmative.

Figure 15A:
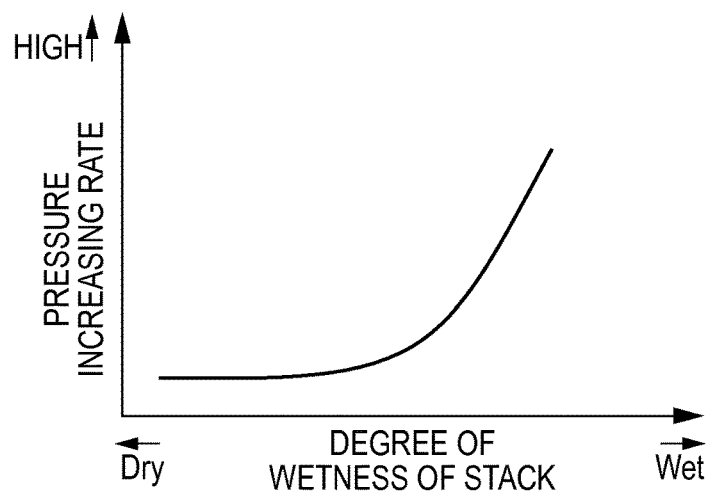
FIG. 15A is a graph illustrating a map for setting a pressure increasing rate of the third embodiment of the fuel cell system.
Figure 15B:
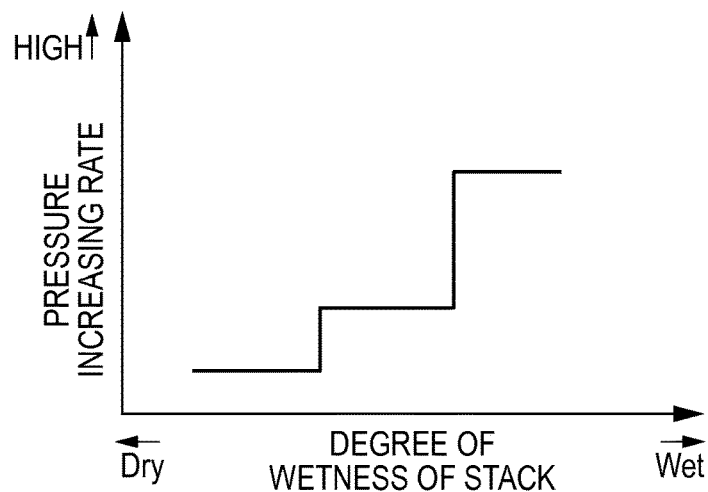
FIG. 15B is a graph illustrating a map for setting the pressure increasing rate of the third embodiment of the fuel cell system.
Figure 15C:
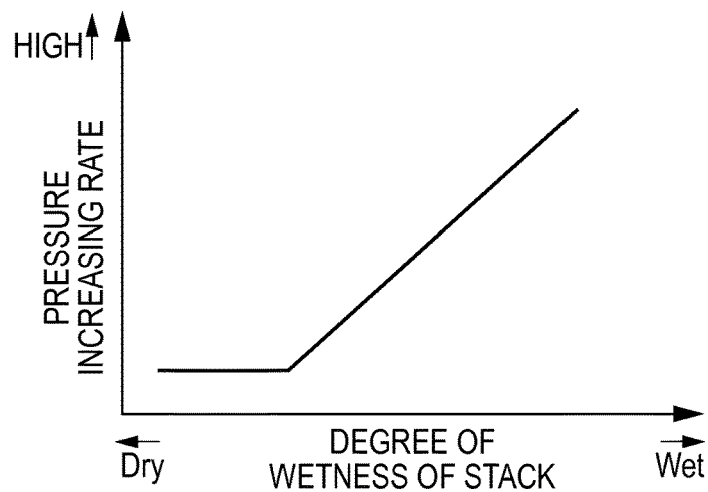
FIG. 15C is a graph illustrating a map for setting the pressure increasing rate of the third embodiment of the fuel cell system.

In Step S403, the controller sets the pressure increasing rate based on the degree of wetness of the electrolyte membrane. Specifically, a map, for example, as shown in FIG. 15A is prepared in advance through experiments and the pressure increasing rate is set by applying the degree of wetness of the electrolyte membrane to that map. It should be noted that the map may be a simple one as shown in FIGS. 15B and 15C. In any case, the pressure increasing rate tends to increase as the degree of wetness of the electrolyte membrane increases.

Figure 16:
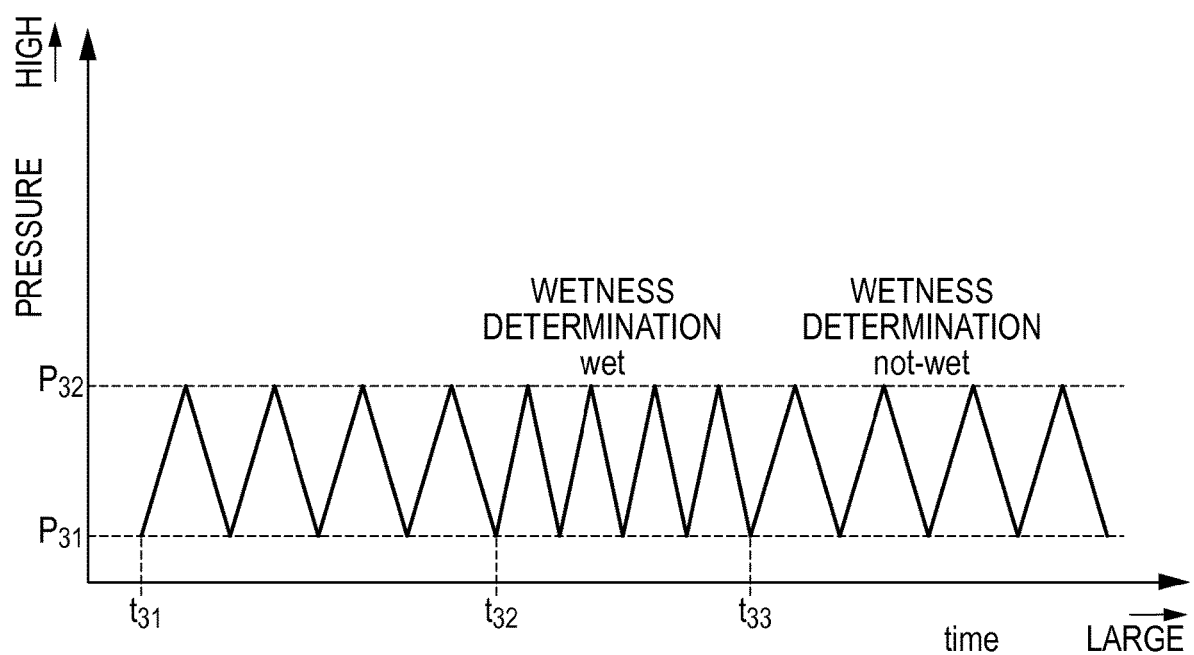
FIG. 16 is a timing chart showing an operation when the control flow chart of the third embodiment is executed.

FIG. 16 is a timing chart showing an operation when the control flow chart of the third embodiment is executed.

In FIG. 16, before time t31, processings of Step S40 (S401→S402→S403)→S1→S2→S3 are performed, the pressure increasing rate corresponding to the degree of wetness of the electrolyte membrane is set and a target lower limit pressure P31 and a target upper limit pressure P32 of the pulsating operation are set based on the target requested load.

The degree of wetness of the electrolyte membrane does not change until time t32. Even if there is a change, the degree of wetness of the electrolyte membrane does not largely change. In this state, processings of Steps S401→S402 are performed in Step S40. Then, a processing is performed as in the first embodiment, whereby the anode pressure pulsates.

At time t32, it is determined that the electrolyte membrane is wet by having a high degree of wetness. In this state, processings of Steps S401→S402→S403 are performed in Step S40 to set the pressure increasing rate again. As is clear from the fact that a gradient when the anode pressure increases is steeper than that when the anode pressure increases before time t32, the pressure increasing rate is set higher than the pressure increasing rate before time t32. Then, a processing similar to the above is performed, whereby the anode pressure pulsates.

At time t33, it is determined that the electrolyte membrane is dry by having a low degree of wetness. In this state, processings of Steps S401→S402→S403 are performed in Step S40 to set the pressure increasing rate again. As is clear from the fact that a gradient when the anode pressure increases is more moderate than that when the anode pressure increases before time t33, the pressure increasing rate is set lower than the pressure increasing rate before time t33. Then, a processing similar to the above is performed, whereby the anode pressure pulsates.

In this third embodiment, the pressure increasing rate is set according to the degree of wetness of the electrolyte membrane. The flow velocity of the anode gas flowing in the anode supply manifold is quickly increased by increasing the pressure increasing rate with an increase in the degree of wetness (i.e. with an increase in the wetness of the electrolyte membrane). By doing so, produced water staying in the gas flow passage of each power generation cell can be removed, whereby the power generation reaction can be stabilized.

Further, the flow velocity of the anode gas flowing in the anode supply manifold is prevented from becoming too fast by decreasing the pressure increasing rate with a decrease in the degree of wetness (i.e. with a decrease in the wetness of the electrolyte membrane). By doing so, the anode gas is substantially uniformly distributed from the anode supply manifold to the gas flow passage of each power generation cell, whereby the power generation reaction can be stabilized.

Fourth Embodiment

Figure 17:
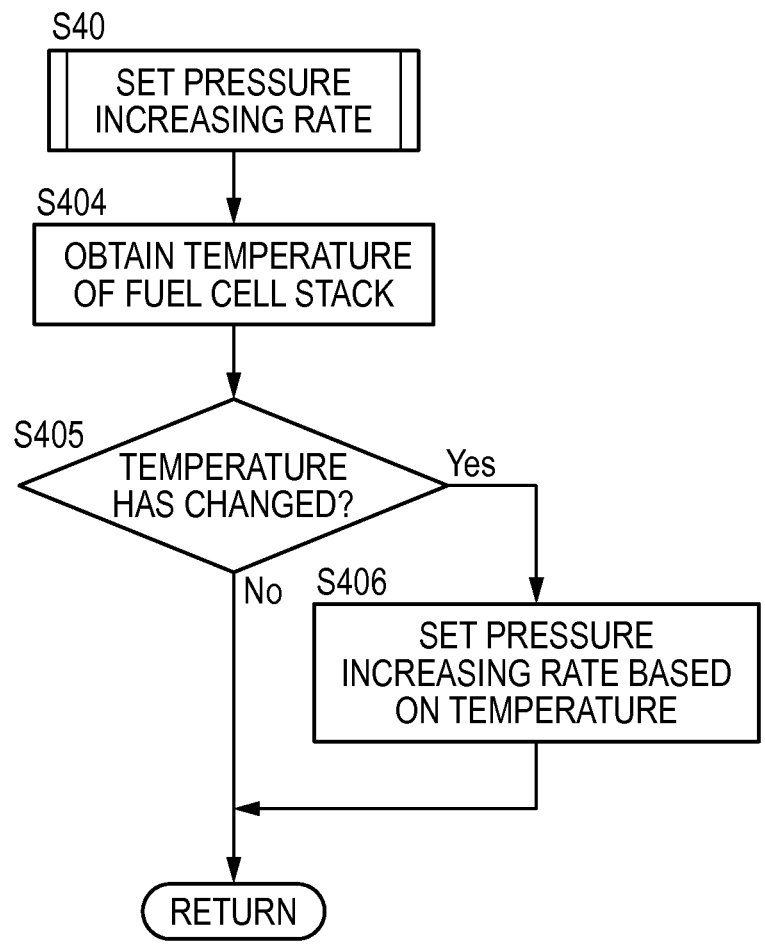
FIG. 17 is a flow chart showing a pressure increasing rate setting routine of a fourth embodiment of the fuel cell system.

FIG. 17 is a flow chart showing a pressure increasing rate setting routine of a fourth embodiment of the fuel cell system.

In the third embodiment, the pressure increasing rate is set according to the degree of wetness of the electrolyte membrane. Contrary to this, in this fourth embodiment, the pressure increasing rate is set according to the temperature of the fuel cell stack. This routine is specifically as follows.

In Step S404, the controller obtains the temperature of the fuel cell stack. Specifically, a temperature sensor may be attached to the fuel cell stack and the temperature may be detected by this temperature sensor. Alternatively, the temperature of the fuel cell stack may be estimated from the temperature of the cooling water.

In Step S405, the controller determines whether or not the temperature of the fuel cell stack has changed. It should be noted that, specifically, the determination is affirmative if the temperature changes beyond a certain range. This is to prevent an error. The controller exits from this process if a determination result is negative while proceeding to Step S406 if the determination result is affirmative.

Figure 18A:
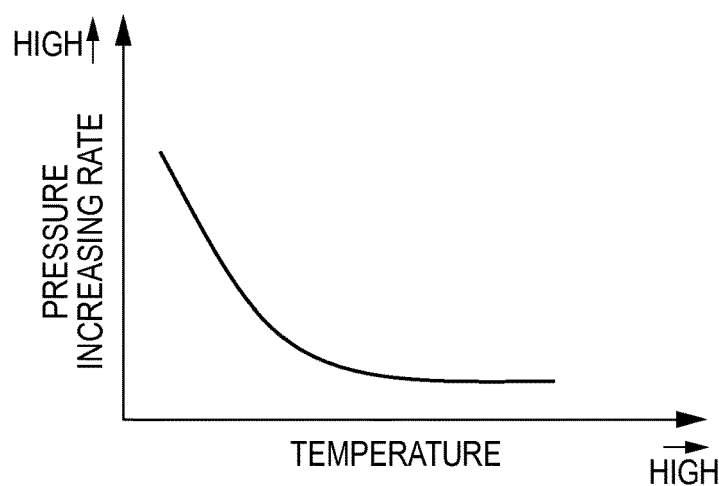
FIG. 18A is a graph illustrating a map for setting a pressure increasing rate of the fourth embodiment of the fuel cell system.
Figure 18B:
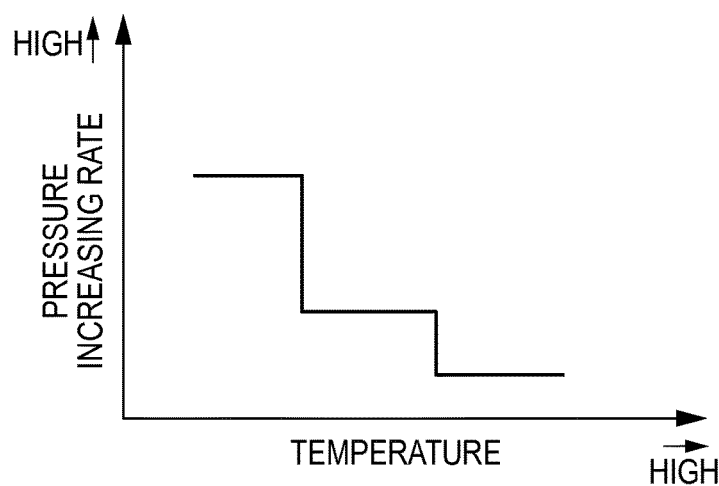
FIG. 18B is a graph illustrating a map for setting the pressure increasing rate of the fourth embodiment of the fuel cell system.
Figure 18C:
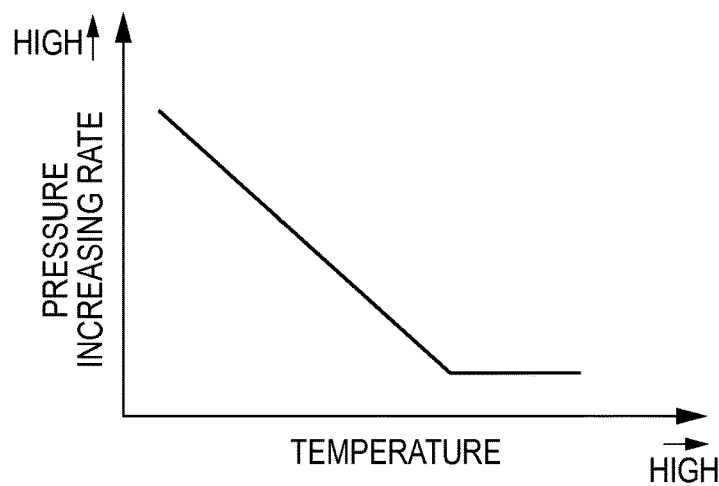
FIG. 18C is a graph illustrating a map for setting the pressure increasing rate of the fourth embodiment of the fuel cell system.

In Step S406, the controller sets the pressure increasing rate based on the temperature of the fuel cell stack. Specifically, a map, for example, as shown in FIG. 18A is prepared in advance through experiments and the pressure increasing rate is set by applying the temperature of the fuel cell stack to that map. It should be noted that the map may be a simple one as shown in FIGS. 18B and 18C. In any case, the pressure increasing rate tends to decrease as the temperature of the fuel cell stack increases.

In this fourth embodiment, the pressure increasing rate is set according to the temperature of the fuel cell stack. The flow velocity of the anode gas flowing in the anode supply manifold is quickly increased by increasing the pressure increasing rate with a decrease in the temperature of the fuel cell stack. Further, the flow velocity of the anode gas flowing in the anode supply manifold is prevented from becoming too fast by decreasing the pressure increasing rate with an increase in the temperature of the fuel cell stack.

The degree of wetness of the electrolyte membrane of the fuel cell stack is correlated with the temperature of the fuel cell stack. The higher the temperature of the fuel cell stack is, the lower the degree of wetness, i.e. the drier the electrolyte membrane becomes. The lower the temperature of the fuel cell stack is, the higher the degree of wetness becomes, i.e. the wetter the electrolyte membrane.

Figure 19:
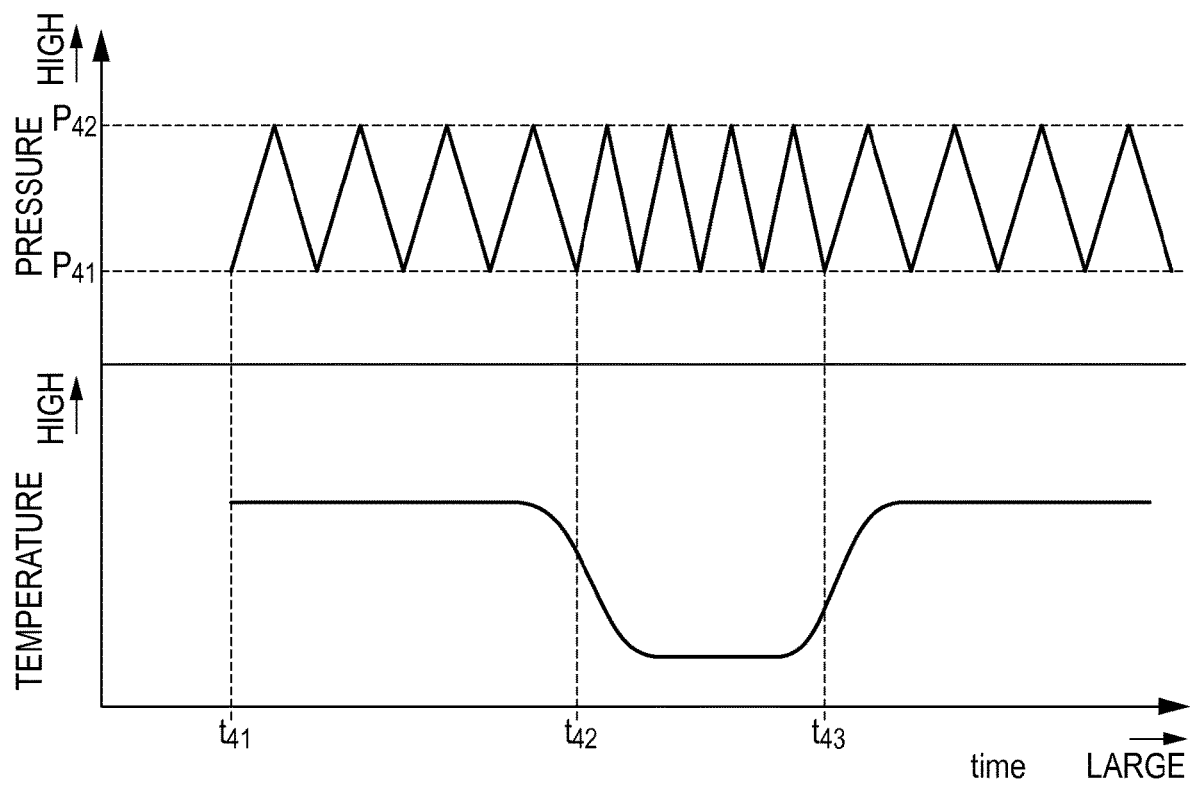
FIG. 19 is a timing chart showing an operation when the control flow chart of the fourth embodiment is executed.

Thus, functions and effects similar to the third embodiment are obtained as shown in FIG. 19 also by setting the pressure increasing rate according to the temperature of the fuel cell stack as in this embodiment. It is easier to obtain the temperature of the fuel cell stack than to obtain the degree of wetness of the electrolyte membrane. Therefore, according to this fourth embodiment, functions and effects similar to the third embodiment can be obtained more easily than in the third embodiment.

Fifth Embodiment

Figure 20:
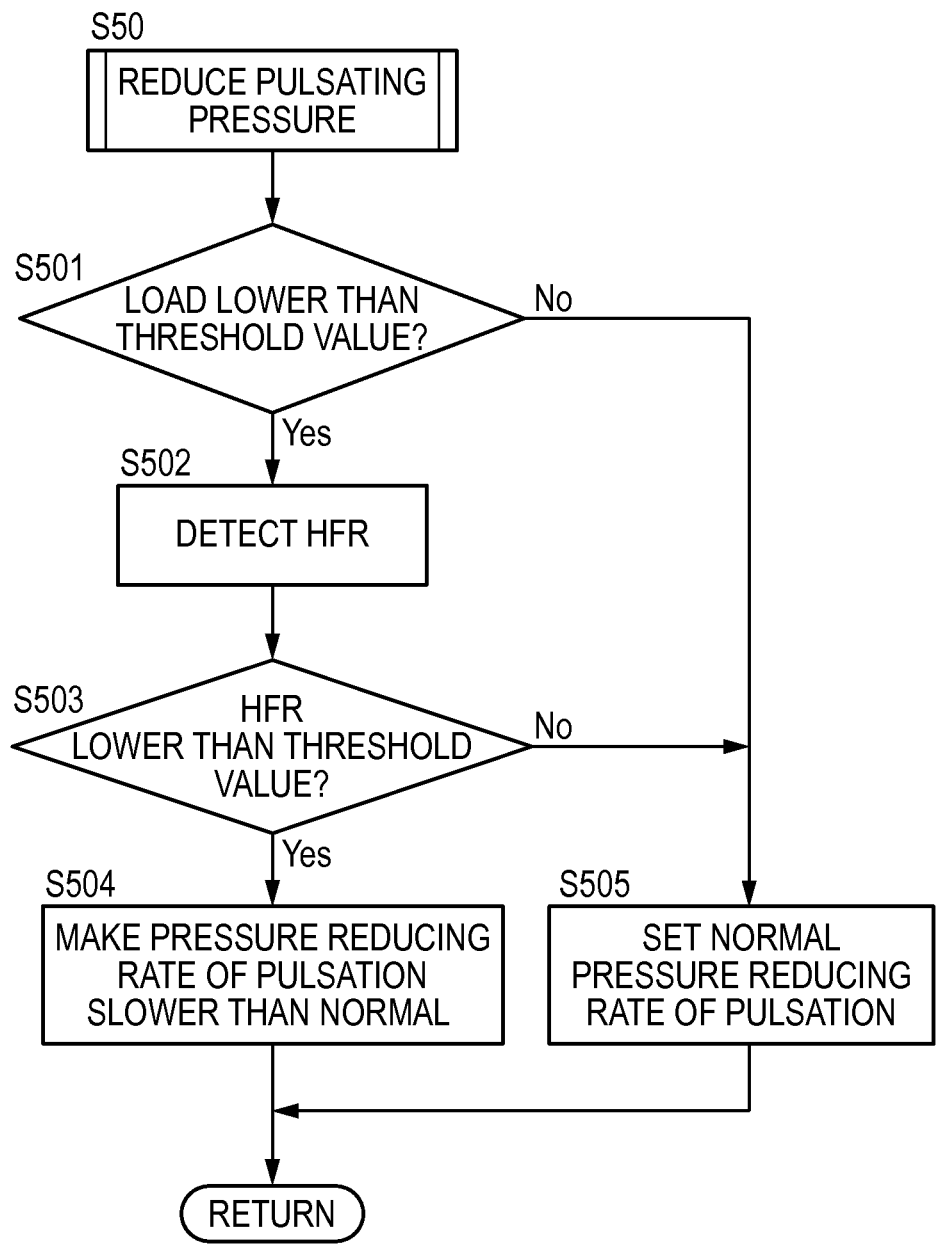
FIG. 20 is a control flow chart of a fifth embodiment executed by a controller, and FIG. 21 are time charts when the fifth embodiment is executed.

FIG. 20 is a control flow chart of a fifth embodiment to be executed by the controller.

Water is produced by the power generation reaction repressed by Formula (1-1). This water permeates through the electrolyte membrane to reach the anode flow passages and excess liquid water is discharged to the buffer tank 400.

The water having flowed to the buffer tank side may possibly return to the fuel cell stack with a decrease in the anode pressure. Since the power generation reaction of the fuel cells becomes more active and produces more water as a load requested to the fuel cell stack increases, the water may return from the buffer tank side when the requested load is high. If the water returns, it may possibly close the anode flow passages and obstruct the power generation reaction.

Accordingly, the inventors suppressed the return of the water from the buffer tank side by slowing a reducing rate of the anode pressure.

Specific control contents are described below.

In Step S501, the controller determines whether or not the load is higher than a threshold value. The controller proceeds to Step S502 if a determination result is affirmative while proceeding to Step S505 if the determination result is negative.

In Step S502, the controller detects HFR.

In Step S503, the controller determines whether or not the HFR is lower than a threshold value. Specifically, whether or not the electrolyte membrane is wet is determined. The controller proceeds to Step S504 if a determination result is affirmative while proceeding to Step S505 if the determination result is negative.

In Step S504, the controller determines a target value of the pressure reducing rate to make the pressure reducing rate of pulsation slower than usual (target rate at which the return of the water from the buffer tank side can be suppressed, but the gas returns to such an extent as not to deteriorate the power generation operation), and executes a feedback control. As described above, the controller sets the pressure increasing rate at the time of increasing the pressure and executes the feedback control to reach the pressure increasing rate. As a result, the opening of the pressure regulating valve is appropriately regulated. In this Step S504, the target value of the pressure reducing rate is similarly determined and the feedback control is executed. As a result, the opening of the pressure regulating valve is appropriately regulated, the pressure regulating valve is opened with a constant opening also at the time of reducing the pressure and the opening of the pressure regulating valve is larger than in Step S505.

In Step S505, the controller determines a target value of the pressure reducing rate to reach a normal pressure reducing rate of pulsation and executes the feedback control. Here, the normal pressure reducing rate is a rate set based on a load or the like when it is not necessary to suppress the return of the water from the buffer tank side.

Figure 21:
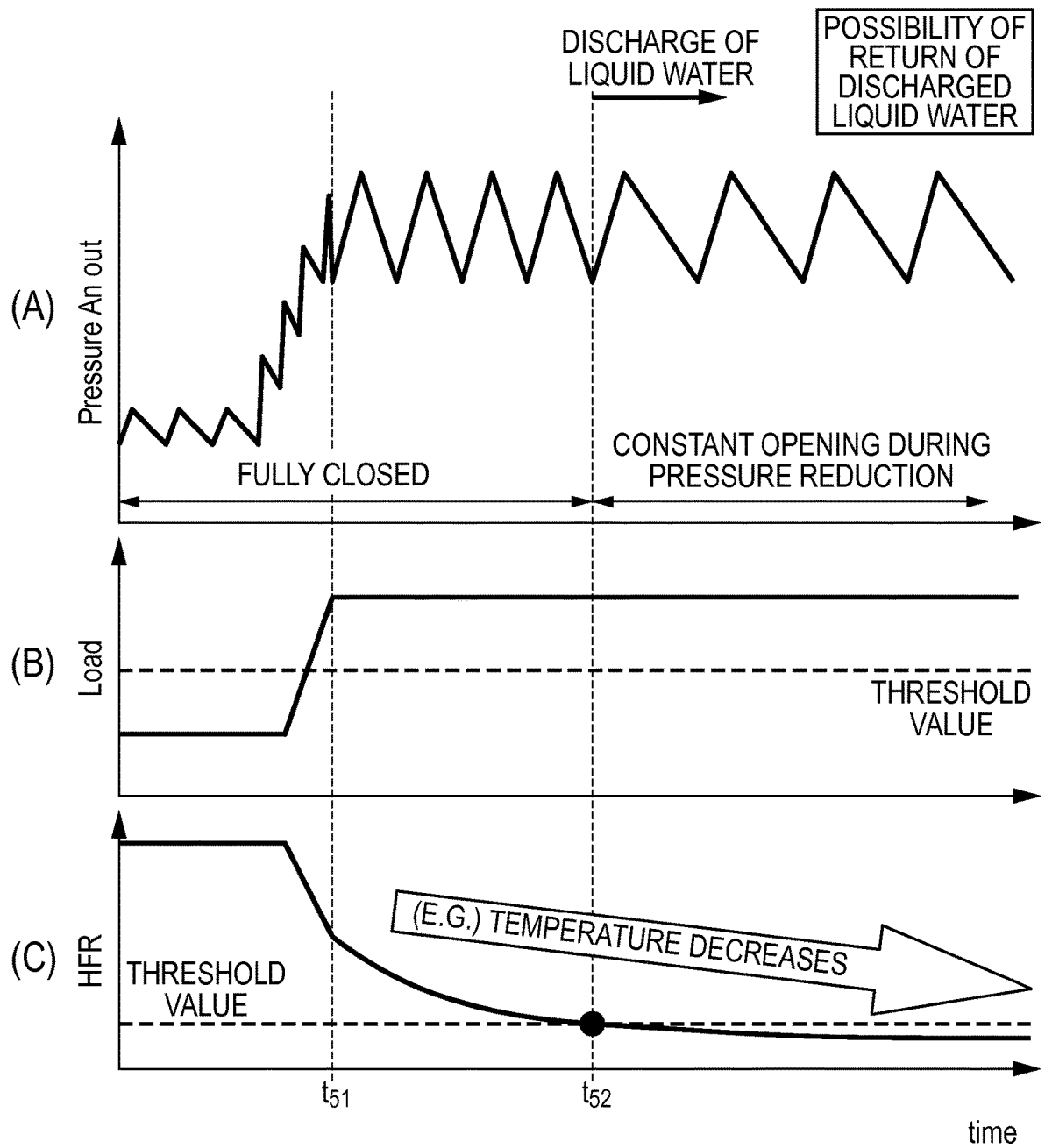

FIG. 21 are time charts when the fifth embodiment is executed.

The anode pressure is low while the load is low.

If the load increases, the anode pressure also increases. Further, the HFR decreases since the power generation reaction is activated to increase the amount of the produced water. However, until time t52, the HFR is higher than the threshold value and the electrolyte membrane is not in an excessively wet state. In this state, the pressure reducing rate of pulsation is set at the normal rate and the pressure regulating valve 300 is fully closed at the time of reducing the pulsating pressure.

After time t52, the HFR becomes lower than the threshold value and liquid water discharged from the fuel cell stack may possibly return at the time of reducing the pulsating pressure. Accordingly, at this time, a target value of the pressure reducing rate of pulsation is determined to be slower than the normal rate and the feedback control is executed. As a result, the pressure regulating valve 300 is kept at a constant opening without being fully closed, thereby slowing the pressure reducing rate of pulsation also at the time of reducing the pulsating pressure. By doing so, a fixed amount of the anode gas is supplied from the hydrogen tank 200 also at the time of reducing the pulsating pressure, thereby suppressing the return of the water from the buffer tank side.

Although the embodiments of the present invention have been described above, the above embodiments are merely an illustration of some application examples of the present invention and not intended to limit the technical scope of the present invention to the specific configurations of the above embodiments.

For example, the above embodiments can be appropriately combined.

Further, the "detection" in the above description includes not only direct detection, but also indirect detection, i.e. estimation from other factor(s).

Further, in the fifth embodiment, a correlation between the pressure reducing rate of pulsation and the opening of the pressure regulating valve may be obtained and the pressure regulating valve may be set to have a desired opening in Steps S504 and S505.

The invention claimed is:

1. A fuel cell system, comprising a fuel cell stack configured to generate power according to a load, a fuel tank configured to store fuel gas, a pressure regulating valve configured to regulate a pressure of the fuel gas supplied from the fuel tank to the fuel cell stack, a purge valve configured to purge the fuel gas discharged from the fuel cell stack, and a controller configured to control the system, wherein:
the controller includes:
a pulsating unit configured to cause a fuel gas pressure of the fuel cell stack to pulsate; and
a pressure increasing rate setting unit configured to set a pressure increasing rate of pulsation of the fuel gas pressure, such that the pressure increasing rate of pulsation is higher in a high-load operation of the fuel cell system than the pressure increasing rate of pulsation is in a low-load operation of the fuel cell system,
wherein the high-load operation of the fuel cell system is a state where the load requested by the fuel cell stack is high and the lower limit of the fuel gas pressure is high, and the low-load operation of the fuel cell system is a state where the load requested by the fuel cell stack is low and the lower limit of the fuel gas pressure is low, and
wherein the controller is configured to:
perform at least one of the low-load operation or the high-load operation in response to the requested load.

2. The fuel cell system according to claim 1, wherein:
the pressure increasing rate setting unit is configured to set the pressure increasing rate to be higher with an increase in the pressure of the fuel gas supplied to the fuel cell stack.

3. The fuel cell system according to claim 1, wherein:
the pressure increasing rate setting unit is configured to set the pressure increasing rate to be higher with an increase in a degree of wetness of an electrolyte membrane of the fuel cell stack.

4. The fuel cell system according to claim 1, wherein:
the pressure increasing rate setting unit is configured to set the pressure increasing rate to be higher with an increase in a lower limit value of the pressure of the fuel gas supplied to the fuel cell stack.

5. The fuel cell system according to claim 1, wherein:
the pressure increasing rate setting unit is configured to set the pressure increasing rate to be higher with a decrease in a temperature of the fuel cell stack.

6. The fuel cell system according to claim 1, wherein:
the pulsating unit configured to increase the fuel gas pressure in the fuel cell stack according to a requested load and cause the fuel gas pressure to pulsate.

7. The fuel cell system according to claim 1, wherein:
the controller further includes a target pressure setting unit configured to set a target upper limit pressure and a target lower limit pressure according to a requested load;

the pulsating unit configured to repeat an operation of executing a feedback control so that an actual pressure of the fuel gas reaches the target upper limit pressure, switching a target value and executing the feedback control so that the actual pressure of the fuel gas reaches the target lower limit pressure when the actual pressure of the fuel gas reaches the target upper limit pressure, and switching the target value and executing the feedback control so that the actual pressure of the fuel gas reaches the target upper limit pressure when the actual pressure of the fuel gas reaches the target lower limit pressure; and the pulsating unit configured to slow a pressure reducing rate of pulsation when the requested load is higher than a predetermined load than when not.

8. The fuel cell system according to claim 7, wherein:

the pulsating unit configured to slow the pressure reducing rate of pulsation by increasing an opening of the pressure regulating valve.

9. The fuel cell system according to claim 1, wherein the controller obtains a target requested load, and the pressure increasing rate setting unit is further configured to set the pressure increasing rate to be higher as the target requested load increases.

* * * * *